(12) United States Patent
Liu et al.

(10) Patent No.: US 11,962,983 B2
(45) Date of Patent: Apr. 16, 2024

(54) WIRELESS EARPHONE

(71) Applicant: Huawei Technologies Co., Ltd., Shenzhen (CN)

(72) Inventors: Qingqiu Liu, Shenzhen (CN); Baoxia Li, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 265 days.

(21) Appl. No.: 17/605,363

(22) PCT Filed: Apr. 17, 2020

(86) PCT No.: PCT/CN2020/085285
§ 371 (c)(1),
(2) Date: Oct. 21, 2021

(87) PCT Pub. No.: WO2020/216140
PCT Pub. Date: Oct. 29, 2020

(65) Prior Publication Data
US 2022/0217466 A1    Jul. 7, 2022

(30) Foreign Application Priority Data

Apr. 25, 2019 (CN) .......................... 201910341316.X

(51) Int. Cl.
*H04R 3/00* (2006.01)
*H04R 1/10* (2006.01)

(52) U.S. Cl.
CPC .......... *H04R 3/007* (2013.01); *H04R 1/1025* (2013.01); *H04R 1/1016* (2013.01); *H04R 2201/107* (2013.01); *H04R 2420/07* (2013.01)

(58) Field of Classification Search
CPC .... H04R 3/007; H04R 1/1025; H04R 1/1016; H04R 2420/07
See application file for complete search history.

(56) References Cited

U.S. PATENT DOCUMENTS 6,031,923 A    2/2000   Gnecco et al.
8,340,339 B2  12/2012  Neu et al.
(Continued)

FOREIGN PATENT DOCUMENTS

CN    201130959 Y    10/2008
CN    201282332 Y    7/2009
(Continued)

*Primary Examiner* — Sunita Joshi
(74) *Attorney, Agent, or Firm* — Conley Rose, P.C.

(57) ABSTRACT

A wireless earphone includes a housing and a power system disposed in a cavity formed by the housing. The power system is configured to supply power to the wireless earphone. The wireless earphone further includes a first electrical connector and a second electrical connector disposed on the housing and are respectively electrically coupled to two electrodes of the power system, and the electrodes include a positive electrode or a negative electrode. At least one of the first electrical connector or the second electrical connector is electrically coupled to one of the electrodes using an anti-interference component. The anti-interference component is configured to suppress an interference signal introduced from the first electrical connector or the second electrical connector.

20 Claims, 14 Drawing Sheets

(56) References Cited

U.S. PATENT DOCUMENTS

| | | | |
|---|---|---|---|
| 2008/0122711 A1* | 5/2008 | Kimura | H01Q 1/273 343/904 |
| 2009/0041290 A1 | 2/2009 | Yang | |
| 2009/0161885 A1 | 6/2009 | Donaldson et al. | |
| 2013/0259276 A1* | 10/2013 | Xu | H04R 5/04 381/309 |
| 2017/0093453 A1 | 3/2017 | Panecki et al. | |
| 2017/0094392 A1 | 3/2017 | Rfer et al. | |
| 2017/0264991 A1 | 9/2017 | Horst et al. | |
| 2018/0103311 A1* | 4/2018 | Chen | H04M 1/04 |

FOREIGN PATENT DOCUMENTS

| | | | |
|---|---|---|---|
| CN | 204031426 U | | 12/2014 |
| CN | 104734321 A | | 6/2015 |
| CN | 106454587 A | | 2/2017 |
| CN | 205961373 U | | 2/2017 |
| CN | 205961373 U | * | 2/2017 |
| CN | 206354604 U | | 7/2017 |
| CN | 107820160 A | | 3/2018 |
| CN | 107889008 A | | 4/2018 |
| CN | 108391191 A | | 8/2018 |
| CN | 207719807 U | | 8/2018 |
| CN | 108810704 A | | 11/2018 |
| CN | 109149540 A | | 1/2019 |
| CN | 109348344 A | | 2/2019 |
| CN | 109599830 A | | 4/2019 |
| CN | 110198503 A | | 9/2019 |
| WO | 2015127972 A1 | | 9/2015 |
| WO | 2017156260 A1 | | 9/2017 |

* cited by examiner

-- Prior Art --

WIRELESS EARPHONE

CROSS-REFERENCE TO RELATED APPLICATIONS

This is a U.S. National Stage of International Patent Application No. PCT/CN2020/085285 filed on Apr. 17, 2020, which claims priority to Chinese Patent Application No. 201910341316.X filed on Apr. 25, 2019. The disclosures of the aforementioned applications are hereby incorporated by reference in their entireties.

TECHNICAL FIELD

Embodiments of this application relate to the field of electronic technologies, and in particular, to a wireless earphone.

BACKGROUND

As wireless earphones are portable, they are favored by increasingly more users. Generally, the wireless earphones are used with earphone boxes. The earphone boxes may accommodate the wireless earphones and charge the wireless earphones.

A corresponding electrical connector may be separately disposed on a housing of a wireless earphone and inside an earphone box, and the electrical connector is configured to conduct and transmit current. When the wireless earphone is accommodated in the earphone box, and the electrical connector on the wireless earphone is in contact with the electrical connector in the earphone box, the wireless earphone may be charged by using a current transmission function of the electrical connector.

The electrical connector disposed on the housing of the wireless earphone and exposed outside the wireless earphone is prone to introduce, into the wireless earphone, interference signals generated by an electrostatic discharge (electro-static discharge, ESD), a surge, and the like. As a result, the interference signal may break down a component in a circuit system in an earphone body or cause other interference and impact on the circuit system, and consequently stability of an earphone system is reduced.

SUMMARY

Embodiments of this application provide a wireless earphone. An electrical connector of the wireless earphone is connected to a circuit system in the wireless earphone after passing through an anti-interference component, to reduce impact, on the circuit system, of high-frequency or high-voltage signals that are generated by an electrostatic discharge (electro-static discharge, ESD), a surge, and the like and that are introduced by the electrical connector from the outside.

To achieve the foregoing objective, the embodiments of this application use the following technical solutions:

According to an aspect, an embodiment of this application provides a wireless earphone, including a housing and a power module disposed in a cavity formed by the housing. The power module is configured to supply power to the wireless earphone. The wireless earphone further includes a first electrical connector and a second electrical connector. The first electrical connector and the second electrical connector are disposed on the housing of the wireless earphone, and are respectively electrically connected to two electrodes of the power module. The electrodes include a positive electrode or a negative electrode. At least one of the first electrical connector or the second electrical connector is electrically connected to the electrode of the power module by using an anti-interference component, and the anti-interference component is configured to suppress an interference signal introduced from the first electrical connector or the second electrical connector. For example, the interference signal may be a high-frequency and high-voltage interference signal.

In this way, an electrical signal input by at least one electrical connector may pass through the anti-interference component, and then access a circuit system in the wireless earphone. In addition, the anti-interference component may suppress interference signals that are generated by an ESD, a surge, and the like and that are introduced by the electrical connector from the outside, so as to reduce interference and impact of these interference signals on the circuit system in the wireless earphone, and improve stability of a wireless earphone system.

In a possible design, the anti-interference component is a bead or a resistor.

The bead and the resistor each have a relatively small volume, and occupy relatively small space on a circuit board. Therefore, space inside the wireless earphone may be saved, and difficulty in designing a circuit board inside the wireless earphone may be reduced.

In another possible design, the first electrical connector and the second electrical connector each are a pogo pin interface, a spring pin, a spring plate, a conductive block, a conductive patch, a conductive plate, a pin, a plug, a contact pad, a jack, or a socket.

In other words, the first electrical connector and the second electrical connector may specifically have a plurality of structures, types, and forms.

In another possible design, the power module includes a power management unit and a battery. The power management unit includes a power management integrated circuit (integrated circuit, IC), a protection IC, and a voltameter IC. At least one of the first electrical connector or the second electrical connector is electrically connected to an electrode at an input end of the power management unit by using the anti-interference component. Two electrodes at an output end of the power management unit are respectively electrically connected to two electrodes of the battery.

In this way, an electrical signal input by the electrical connector from an earphone box is processed by the anti-interference component and processed by the power management unit in the power module, and then transmitted to the battery for charging.

In another possible design, the cavity includes a first printed circuit board and a flexible board electrically connected to the first printed circuit board. The power management unit in the power module is disposed on the first printed circuit board, and a negative electrode of the power management unit is grounded. The battery in the power module is electrically connected to the flexible board, and a negative electrode of the battery is grounded by using the flexible board, so as to be electrically connected to the negative electrode of the power management unit. A positive electrode of the battery is electrically connected to a positive electrode of the power management unit on the first printed circuit board by using the flexible board.

In this way, inside the wireless earphone, the positive electrode and the negative electrode of the battery may be respectively electrically connected to the positive electrode and the negative electrode of the power management unit on the rigid board by using the flexible board, so that an electrical signal on which the power management unit performs processing such as voltage adjustment may be input to the battery for charging.

In another possible design, the housing includes a rod body, and the cavity further includes a second printed circuit board disposed at a bottom of the rod body. The flexible board is configured to electrically connect the first printed circuit board and the second printed circuit board. The first electrical connector is disposed on the second printed circuit board, and the anti-interference component is disposed on the second printed circuit board. The first electrical connector is grounded after being connected to the anti-interference component in series, so as to be electrically connected to the negative electrode of the power management unit.

In this way, the first electrical connector may be electrically connected to the negative electrode of the power management unit after being connected to the anti-interference component disposed on the rigid board.

In another possible design, on the second printed circuit board, the anti-interference component is connected to the first electrical connector by using a printed circuit board (printed circuit board, PCB) cable, and a distance between the printed circuit board PCB cable and another PCB cable is greater than or equal to a preset value.

In this way, high-frequency or high-voltage signals in the PCB cable that are generated by an ESD, a surge, and the like can be prevented from jumping to another PCB cable to a maximum extent, thereby avoiding causing impact on the circuit system and a signal in another PCB cable.

In another possible design, a microphone and a first pickup hole are disposed on the second printed circuit board. A second pickup hole is disposed on the first electrical connector, the pickup hole includes a first hole and a second hole that are disposed on an outer wall of the first electrical connector, and the first hole and the second hole are connected by using a pipe inside the first electrical connector. The pickup hole further includes a third hole, and the third hole extends from the pipe to a side on which the second printed circuit board is located until penetrating the first electrical connector. The first pickup hole and the second pickup hole are configured to transmit a speech signal of a user to the microphone on the second printed circuit board.

In this design, even though no dust filter is disposed for the second pickup hole, the second pickup hole can prevent dust and water from entering the wireless earphone, thereby achieving a dustproof and waterproof effect.

In another possible design, the anti-interference component is disposed on the first printed circuit board, and the second electrical connector is disposed on the flexible board. The second electrical connector is electrically connected to the anti-interference component on the first printed circuit board by using the flexible board, and is electrically connected to the positive electrode of the power management unit on the first printed circuit board after being connected to the anti-interference component in series.

In this way, the second electrical connector may be disposed on the flexible board, and is electrically connected to the negative electrode of the power management unit on the rigid board by using the flexible board and the anti-interference component disposed on the rigid board.

In another possible design, a distance between the first electrical connector and the second electrical connector is greater than or equal to a preset value.

In this solution, the distance between the first electrical connector and the second electrical connector is greater than or equal to the preset value, that is, the first electrical connector and the second electrical connector are disposed in a dispersed manner on the wireless earphone, so that there may be more enough space inside the wireless earphone to dispose each electrical connector and another component used in cooperation with the electrical connector, thereby reducing difficulty in circuit design.

In another possible design, the housing includes the rod body and an earbud connected to a top of the rod body, and the first electrical connector is located at the bottom of the rod body.

In this way, there is only the first electrical connector at the bottom of the rod body, and the bottom of the rod body is more aesthetic.

In another possible design, the first electrical connector is located at the bottom of the rod body, and the second electrical connector is located on an outer side wall of the earbud.

In this way, the distance between the first electrical connector and the second electrical connector is relatively far, and the first electrical connector and the second electrical connector may be dispersed from each other.

In another possible design, the first electrical connector is located at the bottom of the rod body, and the second electrical connector is located on an outer side wall of the rod body.

In other words, the first electrical connector and the second electrical connector may be separately disposed in different parts of the rod body (that is, the bottom of the rod body and the outer side wall of the rod body), and the distance between the first electrical connector and the second electrical connector is greater than the preset value.

In another possible design, the housing includes the rod body and an earbud connected to a top of the rod body, and the first electrical connector and the second electrical connector are located on an outer side wall of the rod body.

In other words, both the first electrical connector and the second electrical connector may be disposed in a same part, that is, the outer side wall of the rod body, and the distance between the first electrical connector and the second electrical connector is greater than the preset value.

In another possible design, the housing includes the rod body and an earbud connected to a top of the rod body, the first electrical connector is located on an outer side wall of the rod body, and the second electrical connector is located on an outer side wall of the earbud.

In other words, the first electrical connector and the second electrical connector may be separately disposed on outer side walls of different parts, that is, the outer side wall of the rod body and the outer side wall of the earbud, and the distance between the first electrical connector and the second electrical connector is greater than the preset value.

In another possible design, the housing includes an earbud, and the first electrical connector and the second electrical connector are located on an outer side wall of the earbud.

In other words, both the first electrical connector and the second electrical connector may be disposed in a same part, that is, the outer side wall of the earbud, and the distance between the first electrical connector and the second electrical connector is greater than the preset value.

In another possible design, the wireless earphone further includes: at least one memory, configured to store program code; at least one processor, configured to execute the program code in the memory to implement a function of the wireless earphone; a wireless communications module, configured to wirelessly communicate with another device; and an audio module, configured to input or output an audio signal.

In other words, the wireless earphone may further have a plurality of other parts to implement a plurality of functions such as wireless communication, audio processing, control, and storage.

According to another aspect, an embodiment of this application provides a system, including the wireless earphone in any one of the possible designs and a mobile phone. The wireless earphone wirelessly communicates with the mobile phone to process audio services such as music and a call of the mobile phone.

According to another aspect, an embodiment of this application provides a system, including the wireless earphone in any one of the possible designs and an earphone box. When the wireless earphone is accommodated in the earphone box, and the first electrical connector and the second electrical connector on the wireless earphone are respectively in contact with a third electrical connector and a fourth electrical connector in the earphone box, the earphone box charges the wireless earphone.

DESCRIPTION OF EMBODIMENTS

The following describes the technical solutions in the embodiments of this application with reference to the accompanying drawings in the embodiments of this application. Apparently, the described embodiments are merely a part rather than all of the embodiments of this application.

The following terms "first", "second" and so on are merely intended for a purpose of description, and shall not be understood as an indication or implication of relative importance or implicit indication of the number of indicated technical features. Therefore, a feature limited by "first" or "second" may explicitly or implicitly include one or more features.

In the descriptions of this application, directions or location relationships indicated by the terms "center", "up", "down", "front", "rear", "left", "right", "vertical", "horizontal", "top", "bottom", "inside", "outside", "transverse", "longitudinal", and the like are based on the directions or location relationships shown in the accompanying drawings, and are merely intended to describe this application and simplify the descriptions, but are not intended to indicate or imply that an apparatus or an element shall have a specific direction or be formed and operated in a specific direction, and therefore shall not be understood as a limitation on this application.

In the descriptions of this application, it should be noted that, terms "dispose", "joint", and "connection" should be understood in a broad sense unless there is a specific stipulation and limitation. For example, "connection" may be a fixed connection, a detachable connection, or an integrated connection. For a person of ordinary skill in the art, specific meanings of the foregoing terms in this application may be understood based on a specific situation.

A wireless earphone may be used in cooperation with electronic devices such as a mobile phone, a notebook computer, and a watch, to process audio services such as media and calls of the electronic devices and some other data services. For example, the audio service may include media services, for example, playing music, recording, a sound in a video file, background music in a game, and an incoming call prompt tone to a user; and may further include playing, in a call service scenario such as a call, a WeChat speech message, an audio call, a video call, a game, or a speech assistant, speech data of a peer end to the user, or collecting speech data of the user and sending the speech data to the peer end.

Figure 1:
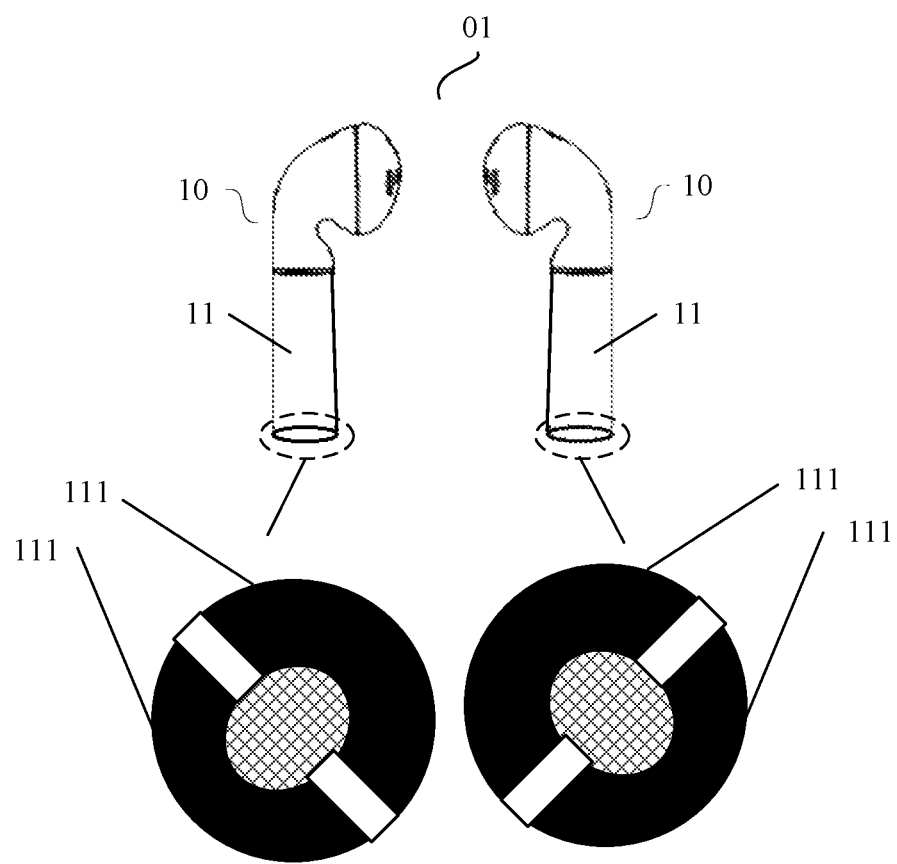
FIG. 1 is a schematic diagram of a wireless earphone according to the conventional technology.

In the conventional technology, the wireless earphone may include a pair of earphone bodies used in cooperation with each other, and each earphone body may include two electrical connectors. For example, as shown in FIG. 1, a wireless earphone 01 includes two earphone bodies 10, and the earphone body 10 may include a rod body 11 and an earbud connected to a top of the rod body 11. Two electrical connectors 111 are disposed at a bottom of the rod body 11. The two electrical connectors 111 on a housing of the earphone body 11 are exposed outside the earphone body 10, and are respectively directly connected to two electrodes (that is, a positive electrode and a negative electrode) of a power module in the earphone body 10 by using a connection cable. In other words, the electrical connector 111 and the electrode of the power module are connected without using another component. In addition, each earphone body may further include a battery. When the two electrical connectors on the earphone body are electrically connected to two electrical connectors that are correspondingly disposed on a charging box, the battery in the earphone body may be charged by using the charging box.

An electrostatic discharge ESD phenomenon is common in daily production and life. For example, the ESD phenomenon may occur when the earphone body is in friction with another object, or a user touches the earphone body by hand. A surge phenomenon may occur due to lightning, and enabling/disabling and a fault of an electrical device. For example, the surge phenomenon may occur at a moment when a circuit is connected during charging of the earphone body. Interference signals, such as high-frequency or high-voltage interference signals generated by an ESD and a surge and another interference signal, may be introduced into the earphone body by using the electrical connector exposed outside the earphone body. The high-frequency and high-voltage interference signal is an interference electrical signal whose frequency is higher than a preset frequency value or whose voltage is higher than a preset voltage value. An example in which an interference signal introduced from the electrical connector into the earphone body includes a high-frequency and high-voltage interference signal is used in the following embodiment for description.

In the conventional technology, because the two electrical connectors disposed on the earphone body are directly connected to the positive electrode and the negative electrode of the power module by using the connection cable, high-frequency or high-voltage interference signals that are generated by an ESD, a surge, and the like and that are introduced by the electrical connector from the outside of the earphone body may break down a component in a circuit system in the earphone body or cause other interference and impact on the circuit system, and consequently stability of an earphone system is reduced.

As a volume of the wireless earphone becomes increasingly small, interference caused to the wireless earphone by the ESD, the surge, and the like become increasingly serious. The electrical connector exposed outside the wireless earphone is more prone to introduce, into the wireless earphone, high-frequency or high-voltage interference signals generated by the ESD, the surge, and the like, which may interfere with or damage a component and a circuit inside the wireless earphone.

Figure 2A:
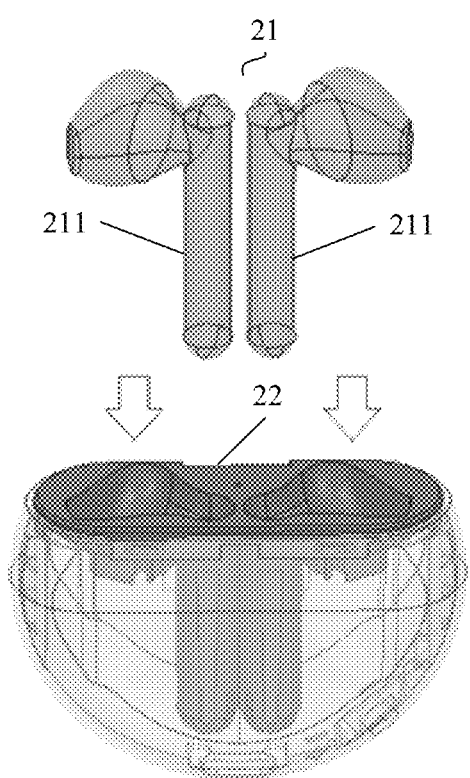
FIG. 2(a) and FIG. 2(b) are a schematic diagram of two groups of wireless earphones and earphone boxes according to an embodiment of this application.
Figure 2B:
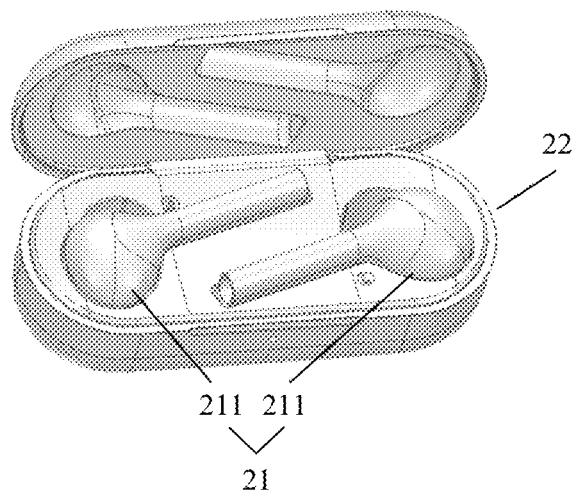

Refer to FIG. 2(a) and FIG. 2(b). An embodiment of this application provides a wireless earphone 21. The wireless earphone 21 may include a pair of earphone bodies 211 that are used in cooperation with left and right ears of a user. The earphone body may be specifically an ear-insert earphone, an ear-hanging earphone, an in-ear earphone, or the like. For example, the wireless earphone may be a true wireless stereo (true wireless stereo, TWS) earphone.

Specifically, each earphone body may include two electrical connectors (or referred to as contacts). At least one electrical connector on each earphone body is electrically connected to an electrode (that is, a positive electrode or a negative electrode) of a power module in the earphone body by using an anti-interference component (or after being connected to the anti-interference component in series). The anti-interference component may be configured to suppress interference signals (such as high-frequency or high-voltage interference signals generated by an ESD and a surge) introduced from the outside by the electrical connector of the earphone body, so as to reduce interference and impact of these interference signals on a circuit system in the earphone body, and improve stability of a wireless earphone system. That the anti-interference component suppresses the high-frequency and high-voltage interference signal may include attenuating, absorbing, or filtering the high-frequency and high-voltage interference signal, so that the high-frequency and high-voltage interference signal loses high-frequency and high-voltage features, thereby reducing impact on a component in an earphone circuit.

In addition, the earphone body may further include a battery. Refer to FIG. 2(a) and FIG. 2(b). When the two electrical connectors on the earphone body 211 are electrically connected to two electrical connectors that are correspondingly disposed on a charging box 22 used to accommodate the wireless earphone 21, the battery in the earphone body 211 may be charged by using the earphone box 22.

Figure 3:
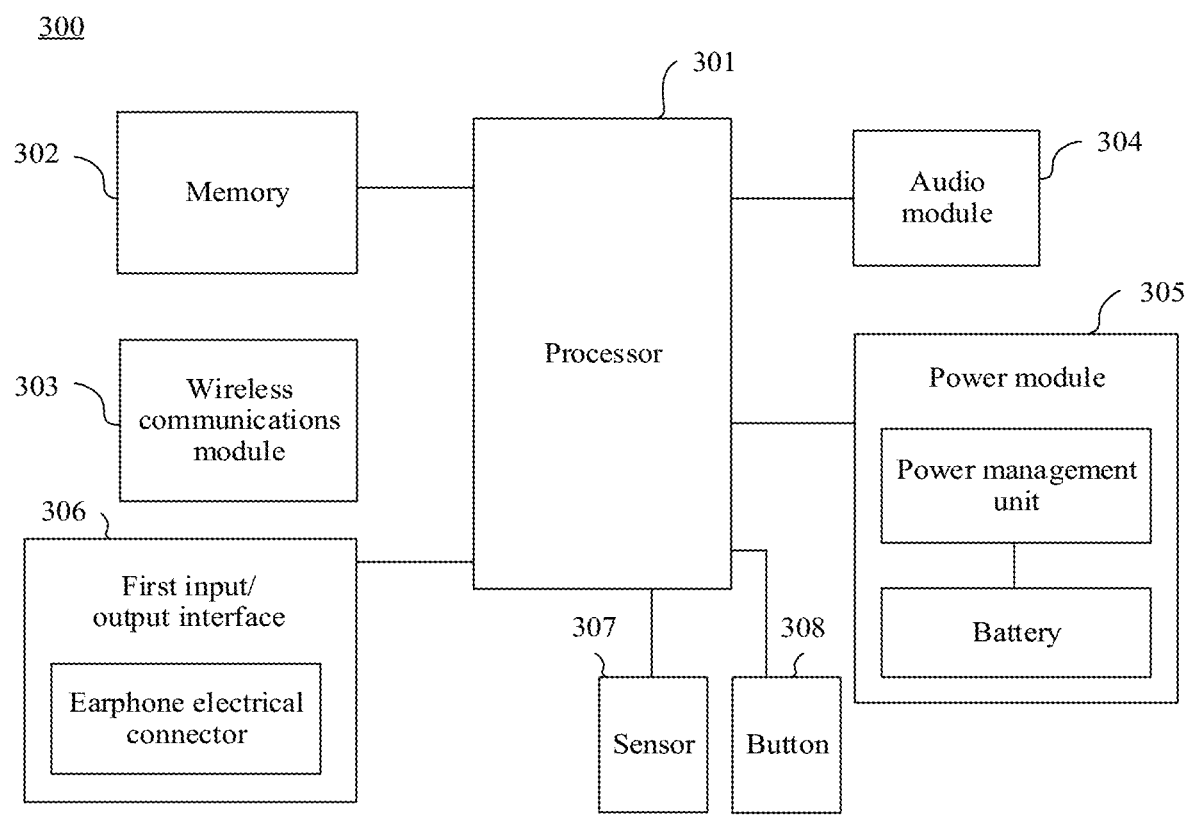
FIG. 3 is a schematic diagram of a structure of a wireless earphone according to an embodiment of this application.

For example, FIG. 3 is a schematic diagram of a structure of a wireless earphone 300 according to an embodiment of this application. The wireless earphone 300 may include at least one processor 301, at least one memory 302, a wireless communications module 303, an audio module 304, a power module 305, a first input/output interface 306, and the like. The processor 301 may include one or more interfaces, configured to connect to another component of the wireless earphone 300.

The memory 302 may be configured to store program code, such as program code used to charge the wireless earphone 300, used for wireless pairing connection between the wireless earphone 300 and another electronic device, or used for wireless communication between the wireless earphone 300 and an electronic device.

The processor 301 may be configured to execute the application program code, and invoke a related module to implement a function of the wireless earphone 300 in this embodiment of this application, for example, implementing a charging function, a wireless communication function, and an audio data play function of the wireless earphone 300. The processor 301 may include one or more processing units, and different processing units may be independent components, or may be integrated into one or more processors 301. The processor 301 may be specifically an integrated control chip, or may be formed by a circuit including various active and/or passive components, and the circuit is configured to perform a function that is described in this embodiment of this application and that belongs to the processor 301.

The wireless communications module 303 may be configured to support data exchange in wireless communication between the wireless earphone 300 and another electronic device or an earphone box, including Bluetooth (Bluetooth, BT), a global navigation satellite system (global navigation satellite system, GNSS), a wireless local area network (wireless local area network, WLAN) (such as a wireless fidelity (wireless fidelity, Wi-Fi) network), frequency modulation (frequency modulation, FM), a near field wireless communication (near field wireless communication, NFC) technology, and an infrared (infrared, IR) technology. In some embodiments, the wireless communications module 303 may be a Bluetooth chip. The wireless earphone 300 may be paired with a Bluetooth chip of another electronic device by using the Bluetooth chip, and establish a wireless connection to the Bluetooth chip, so as to implement wireless communication between the wireless earphone 300 and the another electronic device through the wireless connection.

In addition, the wireless communications module 303 may further include an antenna. The wireless communications module 303 receives an electromagnetic wave over the antenna, performs frequency modulation and filtering processing on an electromagnetic wave signal, and sends a processed signal to the processor 301. The wireless communications module 303 may further receive a to-be-sent signal from the processor 301, perform frequency modulation and amplification on the signal, and convert the signal into an electromagnetic wave for radiation over the antenna.

The audio module 304 may be configured to manage audio data, so that the wireless earphone 300 inputs and outputs an audio signal. For example, the audio module 304 may obtain an audio signal from the wireless communications module 303, or transmit an audio signal to the wireless communications module 303, so as to implement functions, for example, by using the wireless earphone, answering/making a call, playing music, enabling/disabling a speech assistant of an electronic device connected to the earphone, and receiving/sending speech data of a user. The audio module 304 may include a speaker (or referred to as an earpiece or a receiver) component configured to output an audio signal, a microphone (or referred to as a mic or a mike), a microphone pickup circuit in cooperation with the microphone, and the like. The speaker may be configured to convert an audio electrical signal into a sound signal and play the sound signal. The microphone may be configured to convert a sound signal into an audio electrical signal.

The power module 305 may supply power to each module of the wireless earphone 300, support the wireless earphone 300 in receiving charging input, and so on. The power module 305 may include a power management unit (power management unit, PMU) and a battery. The power management unit may include a charging circuit, a voltage drop adjustment circuit, a protection circuit, an electricity quantity measurement circuit, and the like. The charging circuit may receive external charging input. The voltage drop adjustment circuit may change a voltage of an electrical signal that is input by the charging circuit, and then output an electrical signal with a changed voltage to the battery, to complete charging of the battery; or may change an electrical signal that is input by the battery, and then output an electrical signal with a changed voltage to another module such as the audio module 304 or the wireless communications module 303. The protection circuit may be configured to avoid overcharge, overdischarge, a short circuit, overcurrent, and the like of the battery. In some embodiments, the power module 305 may further include a wireless charging coil, configured to wirelessly charge the wireless earphone 300. In addition, the power management unit may be further configured to monitor parameters such as a battery capacity, a quantity of battery cycles, and a battery healthy status (electric leakage and impedance).

A plurality of first input/output interfaces 306 may be configured to provide a wired connection for charging or communication between the wireless earphone 300 and an earphone box. In some embodiments, the first input/output interface 306 may include an earphone electrical connector, and the earphone electrical connector is configured to conduct and transmit current. When the wireless earphone 300 is placed in the earphone box, the wireless earphone 300 may establish an electrical connection to an electrical connector in the earphone box by using the earphone electrical connector (for example, the earphone electrical connector is in direct contact with the electrical connector in the earphone box). After the electrical connection is established, the earphone box may charge a battery in the wireless earphone 300 by using a current transmission function of the earphone electrical connector and the electrical connector in the earphone box. For example, the earphone electrical connector may be a pogo pin, a spring pin, a spring plate, a conductive block, a conductive patch, a conductive plate, a pin, a plug, a contact pad, a jack, or a socket. A specific type of the electrical connector is not limited in this embodiment of this application.

Specifically, the wireless earphone 300 may include a pair of earphone bodies that are used in cooperation with left and right ears of a user, and each earphone body may include two earphone electrical connectors. When the earphone body is placed in an earphone box, the earphone body may establish, by using the two earphone electrical connectors, an electrical connection to two electrical connectors that are correspondingly disposed in the earphone box. After the electrical connection is established, the earphone box may charge a battery in the earphone body.

In some other embodiments, after the electrical connection is established, the wireless earphone 300 may further perform data communication with the earphone box, for example, may receive a pairing instruction from the earphone box.

In addition, the wireless earphone 300 may further include a sensor 307. For example, the sensor 307 may be a distance sensor or a proximity light sensor, and may be configured to determine whether the wireless earphone 300 is worn by a user. For example, the wireless earphone 300 may detect, by using the distance sensor, whether there is an object near the wireless earphone 300, so as to determine whether the wireless earphone 300 is worn by a user. When it is determined that the wireless earphone 300 is worn, the wireless earphone 300 may open the speaker. In some embodiments, the wireless earphone 300 may further include a bone conduction sensor, and form a bone conduction earphone with the bone conduction sensor. By using the bone conduction sensor, the wireless earphone 300 may obtain a vibration signal of an acoustic vibration bone block, and obtain a speech signal through parsing, so as to implement a speech function.

For another example, an outer surface of the wireless earphone 300 may further include: a touch sensor, configured to detect a touch operation of a user; a fingerprint sensor, configured to detect a user fingerprint, identify a user identity, and so on; an ambient light sensor that may adaptively adjust some parameters (such as volume) based on brightness of a sensed ambient light; and some other sensors.

It can be understood that the structure shown in this embodiment of this application constitutes no specific limitation on the wireless earphone 300. The wireless earphone 300 may have more or fewer parts than those shown in FIG. 3, may combine two or more parts, or may have different part configurations. For example, the outer surface of the wireless earphone 300 may further include parts such as a button 308, an indicator (which may indicate a status such as an electricity quantity, an incoming/outgoing call, or a pairing mode), a display screen (which may notify a user of related information), and a dust filter (which may be used in cooperation with the earpiece). The button 308 may be a physical button, a touch button (used in cooperation with the touch sensor), or the like, and is used to trigger an operation such as power-on, power-off, pause, play, recording, starting charging, and stopping charging.

Various parts shown in FIG. 3 may be implemented in hardware that includes one or more signal processing processors or application-specific integrated circuits, in software, or in a combination of hardware and software.

FIG. 2(a) and FIG. 2(b) are a schematic diagram of two types of earphone boxes 22 used to accommodate the wireless earphone 21. In some embodiments, there may be one or more magnets inside the earphone box, to attract the earphone body into a cavity in the earphone box. The earphone box may include a box power module and a plurality of second input/output interfaces. The box power module may supply power to an electrical part in the earphone box, and the box power module may include a battery. In some embodiments, the second input/output interface may be a box electrical connector. The box electrical connector is electrically connected to an electrode of the box power module, and may be configured to conduct and transmit current. The earphone box may include two pairs of box electrical connectors that respectively correspond to the two earphone bodies. After one pair of box electrical connectors in the earphone box are respectively electrically connected to the two earphone electrical connectors in the earphone body, the earphone box may charge the battery in the earphone body by using the battery in the earphone box.

The box electrical connector is used in cooperation with the earphone electrical connector. For example, when the electrical connector in the earphone box is a spring pin, the earphone electrical connector may be a conductive block, a conductive plate, or the like. When the earphone electrical connector is a conductive patch, the box electrical connector may be a conductive plate, a contact pad, or the like. An electrical connection between the earphone electrical connector and the box electrical connector may be established in a plurality of manners, such as surface contact, an inline connection, a threaded connection, and a bayonet connection.

In some other embodiments, at least one touch control may be disposed on the earphone box, and may be configured to trigger the following functions: performing pairing reset for the wireless earphone, charging the wireless earphone, and the like. The earphone box may be further disposed with one or more electricity quantity indicators, so as to notify a user of an electricity quantity of the battery in the earphone box and an electricity quantity of the battery in each earphone body in the earphone box.

In some other embodiments, the earphone box may further include parts such as a processor and a memory. The memory may be configured to store application program code, and execution of the application program code is controlled by the processor of the earphone box, so as to implement each function of the earphone box. For example, the processor of the earphone box charges the wireless earphone after detecting, by executing the application program code stored in the memory, that the wireless earphone is placed in the earphone box and a cover of the earphone box is closed.

In addition, a charging interface may be further disposed on the earphone box, so that the earphone box charges the battery in the earphone box. The earphone box may further include a wireless charging coil, configured to wirelessly charge the battery in the earphone box. It can be understood that the earphone box may further include other parts, which are not described one by one herein.

Figure 4:
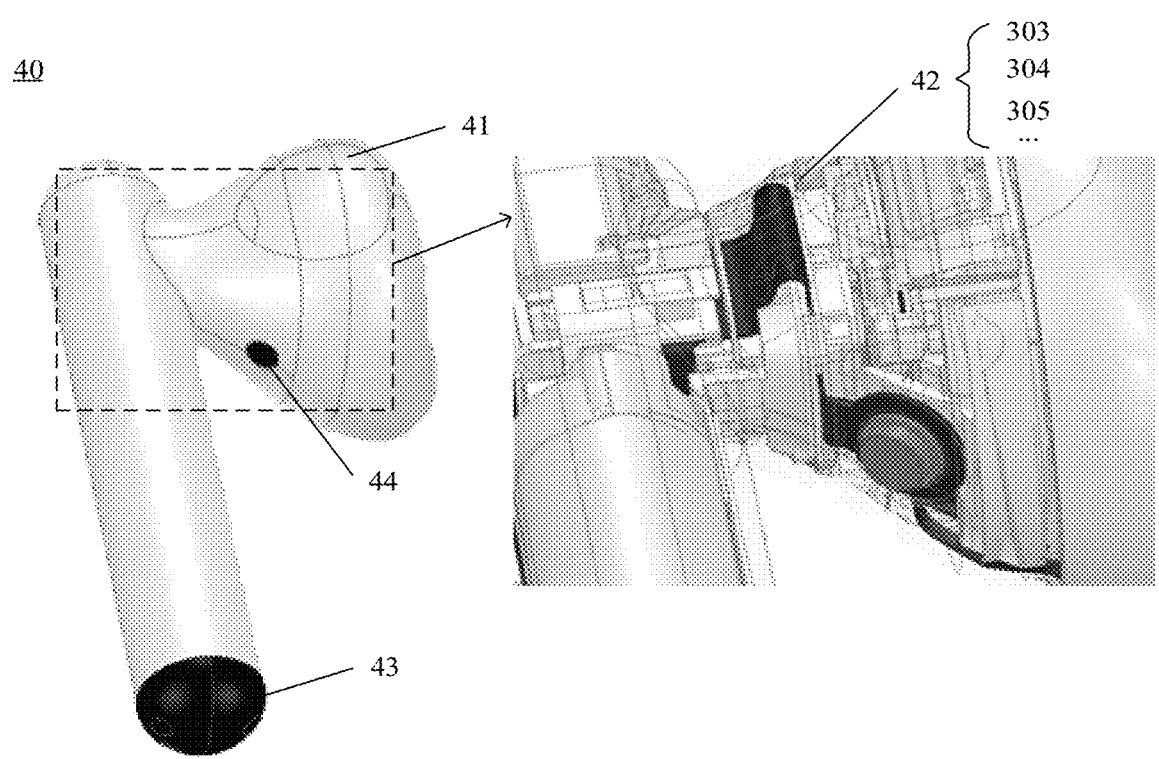
FIG. 4 is a schematic diagram of an earphone body according to an embodiment of this application.

In some embodiments of this application, as shown in FIG. 4, an earphone body 40 in a wireless earphone may include a housing 41 and an internal part 42. The internal part 42 is disposed in a cavity formed by the housing 41. The internal part 42 may include a component in the foregoing modules such as the wireless communications module 303, the audio module 304, and the power module 305. The housing 41 of the earphone body 40 may further include a first earphone electrical connector (that is, a first electrical connector) 43 and a second earphone electrical connector (that is, a second electrical connector) 44 that are connected to the internal part 42.

The first earphone electrical connector and the second earphone electrical connector on the housing are exposed outside the earphone body, so as to be in contact with a box electrical connector to establish an electrical connection to the box electrical connector. The first earphone electrical connector and the second earphone electrical connector may be connected to the internal part in a plurality of manners, such as crimping, welding, buckling, and winding.

In addition, at least one of the first earphone electrical connector or the second earphone electrical connector may be electrically connected to an electrode (that is, a positive electrode or a negative electrode, or referred to as an anode or a cathode) of the power module in the earphone body by using an anti-interference component, so as to charge a battery in the earphone body. The power module may supply power to another circuit in a system. For a corresponding schematic circuit diagram, refer to FIG. 5A. Generally, both the negative electrode of the power module and a negative electrode of the another circuit are grounded.

Figure 5A:
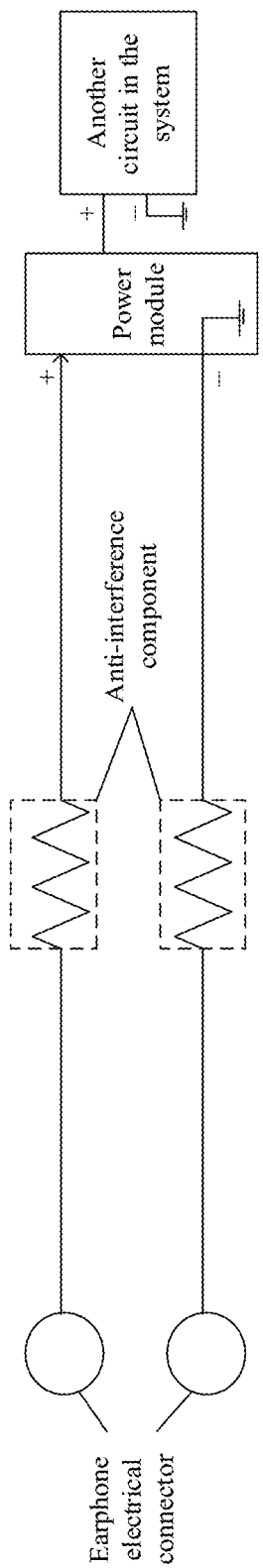
FIG. 5A is a schematic circuit diagram according to an embodiment of this application.

In a solution shown in FIG. 5A, when the earphone body is charged, a normal charging signal and a high-frequency and high-voltage interference signal that are introduced from the earphone electrical connector may pass through the anti-interference component and then access the power module. When the earphone body is not charged, the high-frequency and high-voltage interference signal introduced from the earphone electrical connector may pass through the anti-interference component and then access the power module.

In this way, the high-frequency and high-voltage interference signal introduced from the earphone electrical connector may be suppressed by the anti-interference component and then access the power module, so as to reduce interference and impact of the high-frequency and high-voltage interference signal on a circuit system in the earphone body, and improve stability of an earphone system.

That the earphone electrical connector is electrically connected to the electrode of the power module in the earphone body by using the anti-interference component means that the earphone electrical connector is first electrically connected to the anti-interference component by using a connection cable, and then is electrically connected to the electrode of the power module in the earphone body by using the anti-interference component. In other words, the earphone electrical connector is connected to another circuit in the earphone body after being connected to the anti-interference component.

Figure 5B:
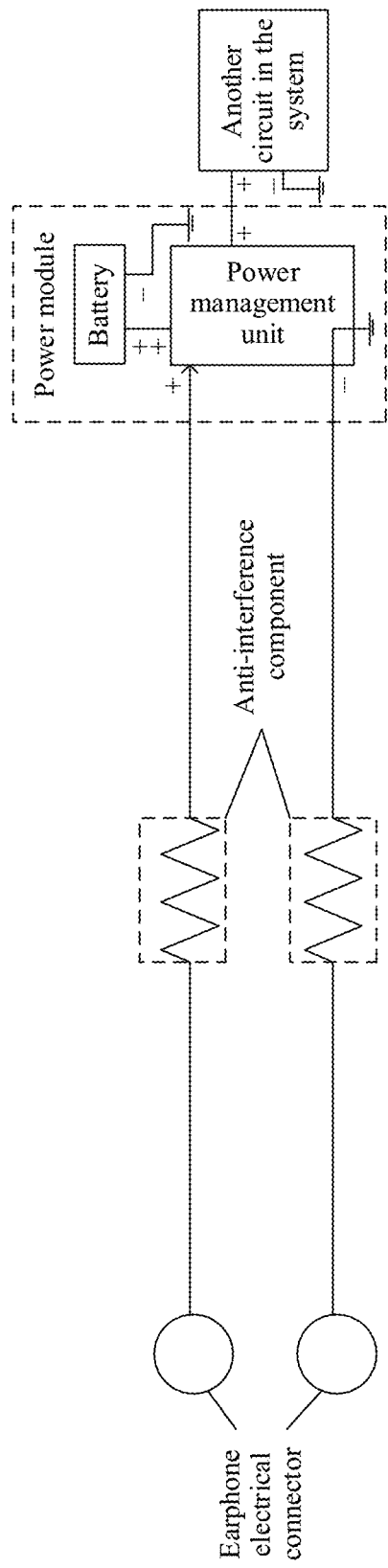
FIG. 5B is another schematic circuit diagram according to an embodiment of this application.

In some embodiments, an electrical signal input by the earphone electrical connector charges the battery in the earphone body after processing such as voltage adjustment is performed by the power management unit on the electrical signal. Therefore, at least one of the first earphone electrical connector or the second earphone electrical connector may be connected to an electrode of the power management unit by using the anti-interference component. Electricity in the battery may be supplied to another circuit in the system after processing such as boosting/bucking is performed on the power by the power management unit. For a schematic circuit diagram corresponding to this case, refer to FIG. 5B. When the earphone body is not charged, a high-frequency and high-voltage interference signal introduced from the earphone electrical connector may pass through the anti-interference component, and then access the power management unit. During charging, a normal charging signal and a high-frequency and high-voltage interference signal that are introduced from the earphone electrical connector may pass through the anti-interference component, and then enter the power management unit, and is input to the battery for charging after being processed by using the power management unit.

In this way, the high-frequency and high-voltage interference signal introduced from the earphone electrical connector may be suppressed by the anti-interference component and then access the power management unit and another circuit, so as to reduce interference and impact, on the circuit system in the earphone body, of high-frequency or high-voltage interference signals generated by an ESD, a surge, and the like, and improve stability of a wireless earphone system.

Specifically, when the first earphone electrical connector is electrically connected to a positive electrode of the power management unit by using the anti-interference component, the second earphone electrical connector may be directly connected to a negative electrode of the power management unit or electrically connected to the negative electrode of the power management unit by using the anti-interference component. When the first earphone electrical connector is electrically connected to the negative electrode of the power management unit by using the anti-interference component, the second earphone electrical connector may be directly connected to the positive electrode of the power management unit or electrically connected to the positive electrode of the power management unit by using the anti-interference component.

In the solution in the conventional technology shown in FIG. 1, the two earphone electrical connectors both are disposed at a bottom of a rod body of the earphone body. For example, for a schematic installation diagram of two electrical connectors at the bottom of the rod body in the solution in the conventional technology, refer to FIG. 5C(a). Two electrical connectors 501 are installed on a circuit board 502 at the bottom of the rod body. For a schematic circuit diagram of the circuit board at the bottom of the rod body, refer to FIG. 5C(b). A circuit board 502 at the bottom of the rod body includes two pads 503 that are used to wield the earphone electrical connector, a disposing region 504 of a component in a microphone pickup circuit, a pickup hole 505, and the like. Corresponding to a location of the pickup hole 505 on the circuit board 502, a pickup hole 506 is also disposed at the bottom of the rod body of the earphone body, so that a speech signal of a user may be transmitted to a microphone by using the pickup hole 506 and the pickup hole 505. In addition, as shown in FIG. 5C(a), a dust filter 507 is further disposed outside the pickup hole 506, to prevent dust and a foreign object from entering the earphone body through the pickup hole 506.

Figure 5C:
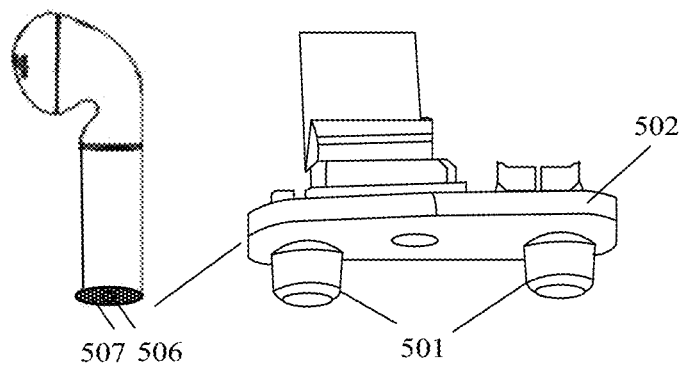
FIG. 5C(a) and FIG. 5C(b) are a schematic installation diagram and a circuit diagram of an earphone electrical connector according to the conventional technology.
Figure 5C:
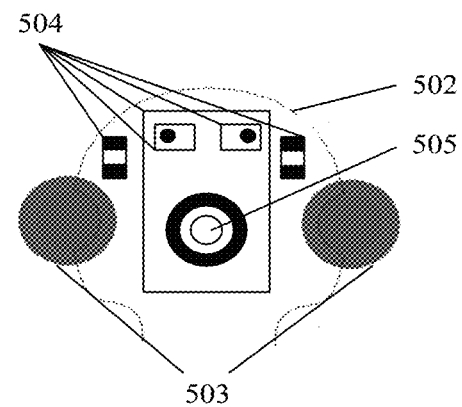

As shown in FIG. 5C(a) and FIG. 5C(b), because space of the bottom of the rod body is limited, space on the circuit board at the bottom of the rod body is also limited. Considering that a component installation error may exist, a specific distance needs to be reserved between different components on the circuit board. In addition, considering impact such as mutual coupling between signals, a specific distance also needs to be reserved between different signals on the circuit board. As a result, space near the earphone electrical connector at the bottom of the rod body is relatively tight. If the anti-interference component is added between the earphone electrical connector and the power module to reduce impact of signals generated by an ESD, a surge, and the like, the space of the bottom of the rod body is tighter, which increases difficulty in designing a wireless earphone circuit.

In some embodiments of this application, the two earphone electrical connectors are disposed in a dispersed manner on the earphone body, that is, both of the two earphone electrical connectors are not disposed at the bottom of the rod body. The dispersed disposing means that a distance between the two electrical connectors on the earphone body is greater than or equal to a preset value. In this way, for each earphone electrical connector disposed in a dispersed manner, there can be enough space inside the earphone body to dispose the anti-interference component, so that circuit design is relatively simple. For example, the earphone body shown in FIG. 4 may include the first earphone electrical connector 43 and the second earphone electrical connector 44 that are disposed in a dispersed manner on the earphone housing and that are connected to the internal part.

Figure 6A:
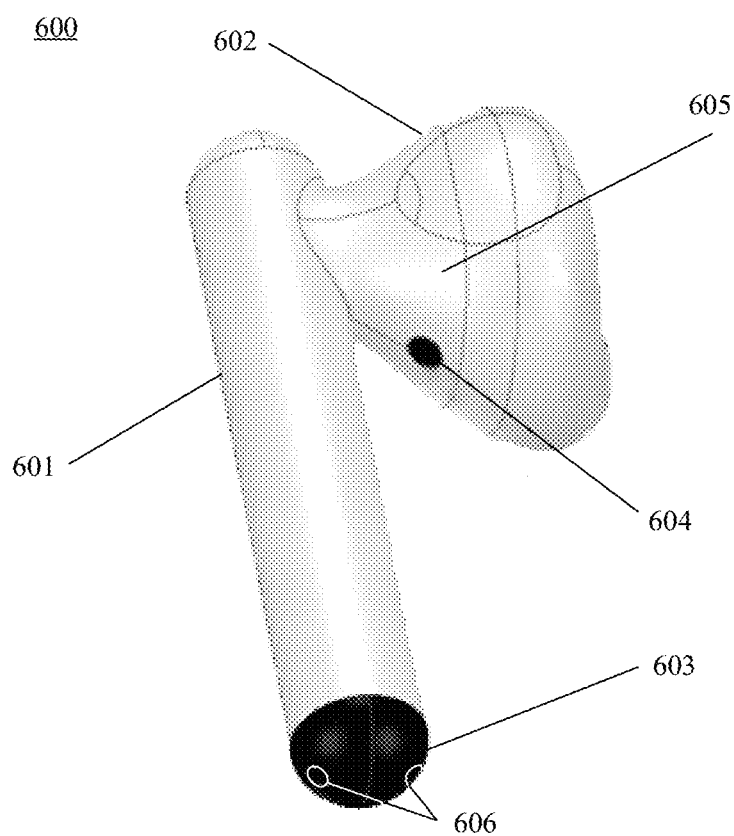
FIG. 6A is a schematic diagram of a group of locations of an earphone electrical connector according to an embodiment of this application.

FIG. 6A is a schematic diagram of a structure of an earphone body 600. The earphone body 600 may include a rod body 601 and an earbud 602 connected to a top of the rod body 601. The rod body 601 and the earbud 602 may include internal parts such as a circuit board and a battery. The circuit board may include a plurality of components such as a processor, a memory, and a charging circuit, so as to implement functions of modules such as the wireless communications module 303, the audio module 304, and the power module 305. For example, the battery may be disposed inside a cavity of the rod body 601. The speaker component in the audio module 304 may be disposed inside a cavity of the earbud 602. When wearing the earbud, a user may hear a sound signal sent from the speaker component, so as to implement the following functions for the user: playing music, answering/making a call, and the like. A first earphone electrical connector is disposed at a bottom of the rod body 601, and a second earphone electrical connector is disposed at another location of the earphone body 600 other than the bottom of the rod body 601, so as to be disposed in a dispersed manner with the first earphone electrical connector.

When only the first earphone electrical connector is disposed at the bottom of the rod body, space of the entire bottom of the rod body may be used to dispose the first earphone electrical connector. Therefore, an area of the first earphone electrical connector is relatively large, and an area in which the first earphone electrical connector is in contact with a box electrical connector during charging is relatively large, a contact property is relatively good, a contact resistance is relatively small, and charging efficiency is also relatively high.

In addition, when only one earphone electrical connector is disposed at the bottom of the rod body, the bottom of the rod body can be designed more aesthetic. When another earphone electrical connector is disposed at a location that is on an outer side wall of the earbud and that is opposite to a side on which the rod body extends towards the bottom, the earphone electrical connector is not easily seen by a user, and may be blocked by the rod body or the earbud, so that the earphone body looks simpler and more aesthetic.

In some embodiments, the first earphone electrical connector is disposed at the bottom of the rod body 601, and the second earphone electrical connector is disposed at any location on an outer side wall 605 of the earbud 602, so as to be disposed in a dispersed manner with the first earphone electrical connector.

For example, as shown in FIG. 6A, a first earphone electrical connector 603 is disposed at the bottom of the rod body 601, or the first earphone electrical connector 603 is disposed at the bottom of the rod body 601, and is disposed in cooperation with the rod body 601. The first earphone electrical connector 603 is not on the outer side wall of the rod body 601. A second earphone electrical connector 604 is disposed at a location that is on the outer side wall 605 of the earbud 602 and that is opposite to the side on which the rod body 601 extends towards the bottom (or referred to as a location facing the side on which the rod body 601 extends towards the bottom).

In some embodiments, the first earphone electrical connector 603 and the second earphone electrical connector 604 are respectively electrically connected to two electrodes of a power management unit by using an anti-interference component. The anti-interference component may be a component such as a bead or a resistor that occupies relatively small space.

Figure 6B:
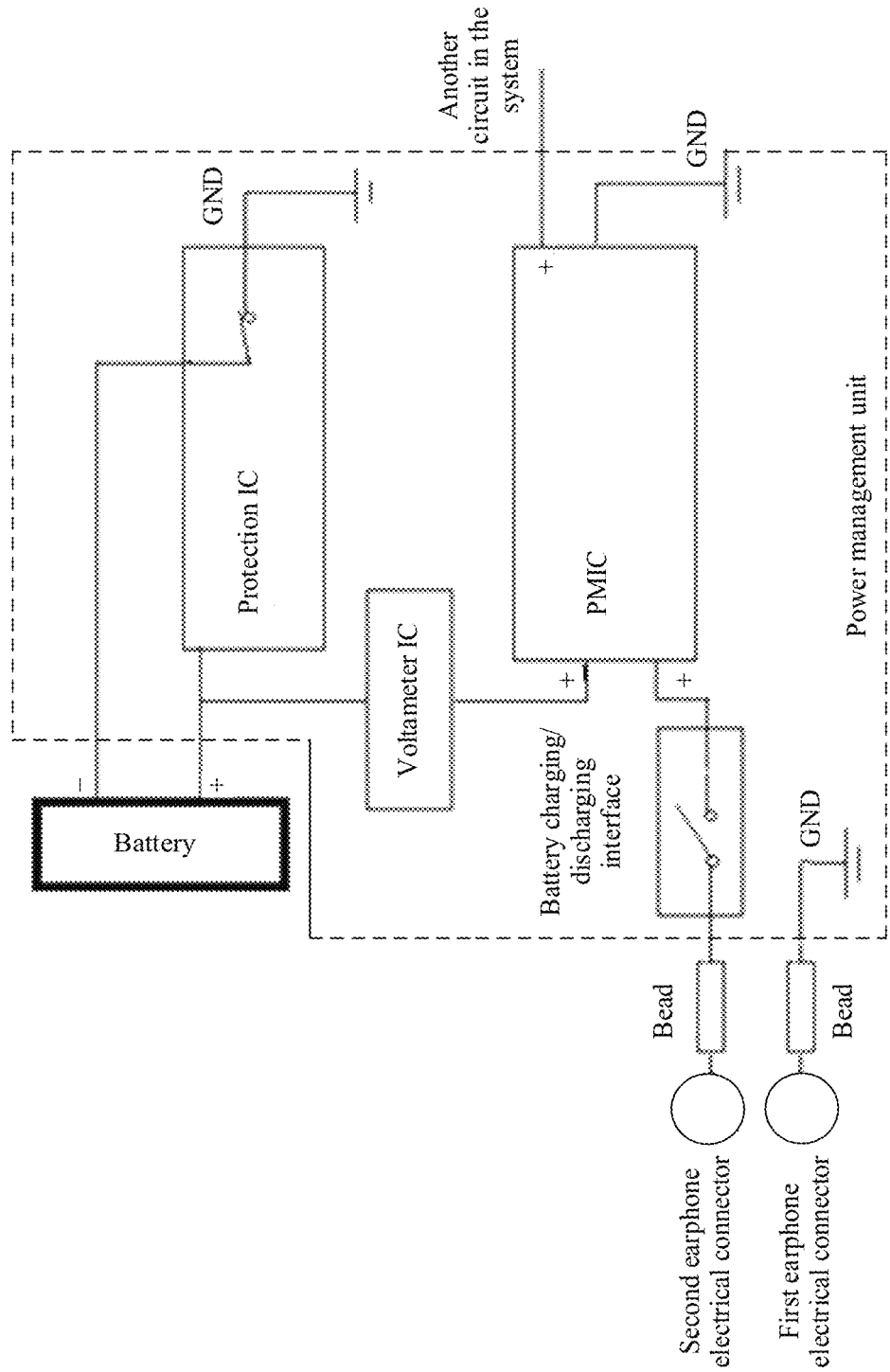
FIG. 6B is another schematic circuit diagram according to an embodiment of this application.

For example, refer to the circuit diagram shown in FIG. 6B. The power management unit may include a battery charging/discharging interface, a voltameter integrated circuit (integrated circuit, IC) configured to measure an electricity quantity, a protection IC, a power management integrated circuit (power management integrated circuit, PMIC), and the like. The PMIC has functions of a charging circuit, a voltage drop adjustment circuit, and the like. The second earphone electrical connector is electrically connected to the battery charging/discharging interface by using a bead, and is electrically connected to a positive electrode at an input end of the PMIC by using the battery charging/discharging interface. A positive electrode at an output end on which processing such as boosting/bucking is performed by the PMIC is electrically connected to a positive electrode of the battery and a positive electrode of the protection IC by using the voltameter IC. The first earphone electrical connector is grounded (GND) by using a bead, and negative electrodes of the PMIC and the protection IC both are grounded. To be specific, the first earphone electrical connector is electrically connected to the negative electrodes of the PMIC and the protection IC by using the bead, that is, the first earphone electrical connector is electrically connected to a negative electrode of the power management unit by using the bead. In addition, as shown in FIG. 6B, the PMIC is further electrically connected to another circuit in a system, so that after performing processing such as voltage adjustment on electricity in the battery, the PMIC outputs adjusted power to the another circuit in the system for power supply.

In some embodiments, a circuit board inside the earphone body may be a rigid-flex board, that is, a circuit board combining a flexible board (also referred to as a flexible printed circuit board (flexible printed circuit, FPC)) and a rigid board (that is, a printed circuit board). For example, the circuit board may include a first rigid board, a second rigid board, and a flexible board configured to electrically connect the first rigid board and the second rigid board. The first rigid board is a motherboard, another circuit (for example, an audio output circuit) in the audio module, the charging circuit and the protection circuit in the power management unit, a data processing circuit in the wireless communications module, and the like are mainly disposed on the motherboard. A microphone pickup circuit may be disposed on the second rigid board. A flat cable used to connect the first rigid board and the second rigid board may be disposed on the flexible board. The second rigid board may be disposed at the bottom of the rod body. The flexible board may be disposed inside the rod body. The first rigid board may be disposed inside the earbud.

In some embodiments, the first earphone electrical connector 603 shown in FIG. 6A is electrically connected to one electrode of the power management unit in the earphone body 600. A hole may be disposed at a location that is on the outer side wall 605 of the earbud 602 and that is opposite to the side on which the rod body 601 extends towards the bottom, and the second earphone electrical connector 604 is electrically connected to the other electrode of the power management unit in the earphone body 600 through the hole.

In some embodiments, the first earphone electrical connector is electrically connected to a negative electrode of a circuit on the second rigid board by using a first anti-interference component. The first anti-interference component may be disposed at any location on the second rigid board. Negative electrodes of circuits on the circuit board are usually electrically connected together (for example, all are grounded). Therefore, when the first earphone electrical connector is electrically connected to the negative electrode of the circuit on the second rigid board or a negative electrode of another circuit by using the first anti-interference component, the first earphone electrical connector is electrically connected to the negative electrode of the power management unit and a negative electrode of the power module by using the first anti-interference component.

In this way, when the first earphone electrical connector and the second earphone electrical connector respectively establish an electrical connection to a first box electrical connector and a second box electrical connector in an earphone box, the first earphone electrical connector may receive a signal from the earphone box. After being suppressed by the first anti-interference component, a high-frequency and high-voltage interference signal in the signal is input to the power management unit, and then processed by the power management unit, and input to the battery in the earphone body for charging. When the earphone body is not charged, a high-frequency and high-voltage interference signal introduced by the first earphone electrical connector from the outside may be first suppressed by the first anti-interference component, and then enter the power management unit and another circuit. Therefore, impact, on a circuit system, of high-frequency or high-voltage interference signals that are generated by an ESD, a surge, and the like and that are introduced by the earphone electrical connector from the outside may be reduced, and stability of an earphone system may be improved.

Figure 7:
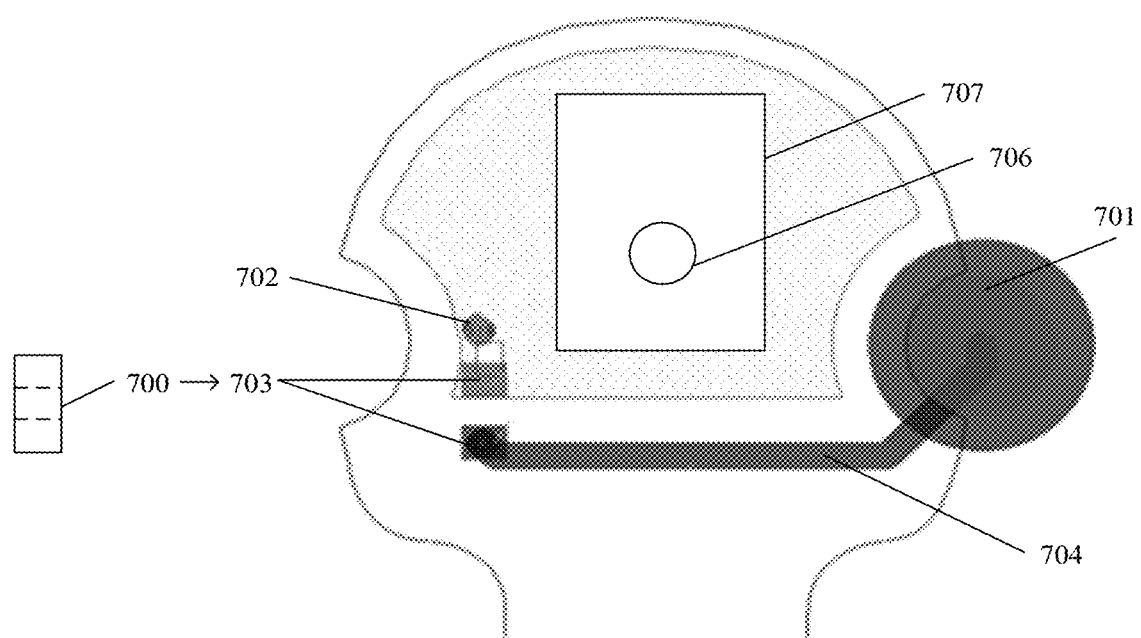
FIG. 7 is a schematic diagram of a circuit board according to an embodiment of this application.

For example, for a circuit diagram of the second rigid board, refer to FIG. 7. As shown in FIG. 7, the second rigid board may include a pad 701 of the first earphone electrical connector, a circuit negative electrode 702 on the second rigid board, a disposing region 703 of a first anti-interference component 700, and a connection cable 704. The region 703 includes two rectangular welding regions used to weld the first anti-interference component 700. The first earphone electrical connector is welded on the second rigid board by using the pad 701, and is electrically connected to the first anti-interference component 703 by using a PCB cable 704. The first anti-interference component 700 wielded on the second rigid board is electrically connected to the circuit negative electrode 702 on the second rigid board by using the connection cable, that is, is electrically connected to the negative electrode of the power module. In addition, the second rigid board may further include a first pickup hole 706, a microphone, a disposing region 707 of the microphone, another component in the microphone pickup circuit, and the like.

In this way, on the second rigid board, there is only one pad used to wield an earphone electrical connector. The first earphone electrical connector welded by using the pad is connected to the first anti-interference component by using the connection cable. When a multimeter or another tool is used to measure a resistance between the first earphone electrical connector and the first anti-interference component, if the resistance is almost 0 ohms, it may indicate that the first earphone electrical connector is electrically connected to the first anti-interference component by using the PCB cable and is not electrically connected to the first anti-interference component by using another component. Therefore, the first earphone electrical connector may be connected to another circuit in the earphone body by using the first anti-interference component.

In addition, as shown in FIG. 6A, one or more second pickup holes 606 may be further disposed at the bottom of the rod body 601. The second pickup hole 606 may penetrate the first earphone electrical connector 603, so that a speech signal of a user may be transmitted to the microphone on the second rigid board through the first pickup hole on the second rigid board and the second pickup hole 606, thereby implementing a pickup function of the microphone.

An area of the bottom of the rod body is relatively small, for example, a diameter may be 5 mm. An area of the second rigid board disposed at the bottom of the rod body is also relatively small, for example, the area may be 5 mm×5 mm. Therefore, space occupied by the first anti-interference component configured to suppress high-frequency or high-voltage interference signals generated by an ESD, a surge, and the like should also be relatively small. For example, the first anti-interference component may be a bead or a resistor.

In some embodiments, to avoid a problem that a component cannot be installed due to an installation error, a distance between the first earphone electrical connector and another component on the circuit board should be greater than a preset distance 1 (for example, 0.5 mm). To prevent the high-frequency or high-voltage interference signals generated by the ESD, the surge, and the like from being directly introduced into another signal due to an excessively short distance, a distance between another PCB cable (including the pad on the circuit board) and the PCB cable 704 that is on the circuit board and that is used to connect the first earphone electrical connector and the anti-interference component should be greater than a preset distance 2 (for example, 8 mil).

Figure 8A:
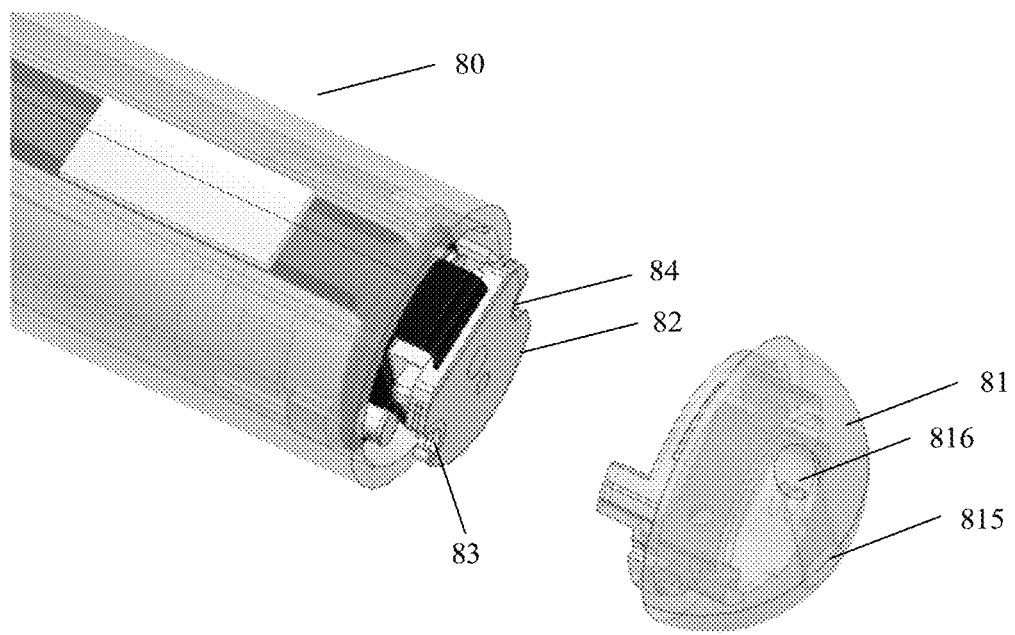
FIG. 8(a) and FIG. 8(b) are a schematic diagram of a structure and connection of an earphone electrical connector according to an embodiment of this application.
Figure 8B:
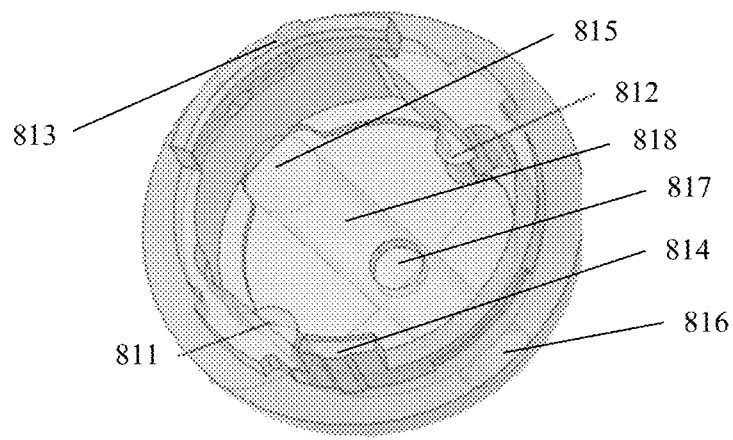

For example, the first earphone electrical connector 603 shown in FIG. 6A may be specifically a hemispherical conductor 81 that cooperates with a rod end, as shown in FIG. 8(a). In some embodiments, the entire hemispherical conductor 81 may be a conductive material. For example, the conductive material may be a metal or an alloy. In some other embodiments, the hemispherical conductor 81 is formed by plating a conductive material on an outer surface of a hemispherical plastic body. In this case, the first earphone electrical connector has a relatively small weight, and the earphone body is lighter. In addition, as shown in FIG. 8(a), a buckling groove 83 and a buckling groove-shaped pad 84 are formed on a second rigid board 82 at a bottom of a rod body 80. As shown in FIG. 8(b), a buckle part 811 and a connection part 812 are disposed on the conductor 81. The buckle part 811 may match a shape and a size of the buckling groove 83, and inwardly form a protrusion (or referred to as an inwardly extended step). The connection part 812 may match a shape and a size of the buckling groove-shaped pad 84, and inwardly form a protrusion (or referred to as an inwardly extended step). The buckle part 811 is buckled to a location at which the buckling groove 83 is located. The connection part 812 is welded to a location at which the buckling groove-shaped pad 84 is located, so that the conductor 81 is connected to the second rigid board 82. It can be understood that the locations of the buckling groove 83 and the buckling groove-shaped pad 84 may also be interchanged. In addition, the conductor 81 may further include another part, configured to fasten the conductor 81 to the bottom of the rod body 80. For example, as shown in FIG. 8(b), the conductor 81 includes a part 813 and a part 814 that extend to the outside and that may be adhesively fastened to a housing of the rod body 80 by using an adhesive, so that the conductor 81 is fastened to the bottom of the rod body 80.

In addition, as shown in FIG. 8(a) and FIG. 8(b), three second pickup holes are disposed on the conductor 81: a pickup hole 815, a pickup hole 816, and a pickup hole 817. The pickup hole 815 and the pickup hole 816 (that is, a first hole and a second hole) are disposed penetrating the conductor 81; or in other words, the pickup hole 815 and the pickup hole 816 are disposed on an outer wall of the conductor 81. In addition, diameters of the pickup hole 815 and the pickup hole 816 are relatively small, for example, 0.8 mm, which is smaller than a diameter of the pickup hole 506 shown in FIG. 5C(a). The pickup hole 815 and the pickup hole 816 are connected by using a pipe 818 inside the conductor 81. The pickup hole 817 (that is, a third hole) is disposed on a side that is on the pipe and that faces the second rigid board 82, and the pickup hole 817 extends from the pipe 818 to a side on which the second rigid board 82 is located until penetrating the conductor 81. The pickup hole 815, the pickup hole 816, and the pickup hole 817 are in a T structure. Even though no dust filter is disposed for the second pickup hole in this structure, the second pickup hole can prevent dust and water from entering the earphone body, thereby achieving a dustproof and waterproof effect. In addition, a location of the pickup hole 817 may be opposite to a location of the first pickup hole 706 on the second rigid board 82. A speech signal of a user may be transmitted to the pickup hole 817 through the pickup hole 815 and the pickup hole 816, and transmitted to the first pickup hole 706 through the pickup hole 817, so as to be transmitted to the microphone on the second rigid board 82.

It can be understood that the first earphone electrical connector disposed at the bottom of the rod body may be in another form other than the case shown in FIG. 8(a) and FIG. 8(b). This is not limited in this embodiment of this application. For example, the first earphone electrical connector may be a spring plate, a contact pad, or the like.

In some embodiments, on the basis that the first earphone electrical connector is connected to the power module in the earphone body by using the first anti-interference component, to suppress high-frequency or high-voltage interference signals generated by an ESD, a surge, and the like, the second electrical connector may be directly electrically connected to the power module in the earphone body without using the anti-interference component.

In some other embodiments, on the basis that the first earphone electrical connector is connected to the power module in the earphone body by using the first anti-interference component, to suppress high-frequency or high-voltage interference signals generated by an ESD, a surge, and the like, the second electrical connector may access the circuit system in the earphone body by using a second anti-interference component, so as to better suppress the high-frequency or high-voltage interference signals such as the ESD and the surge.

The second anti-interference component configured to suppress the high-frequency or high-voltage interference signals generated by the ESD, the surge, and the like may be a component such as a bead or a resistor that occupies relatively small space, or may be another component that is configured to suppress a high-frequency and high-voltage interference signal and that occupies relatively large space. For example, when the second electrical connector is disposed at a location shown in FIG. 6A, because space of the earbud part is relatively large, the second anti-interference component may be either a bead or a resistor, or may be another component. This is not limited in this embodiment of this application.

Figure 9A:
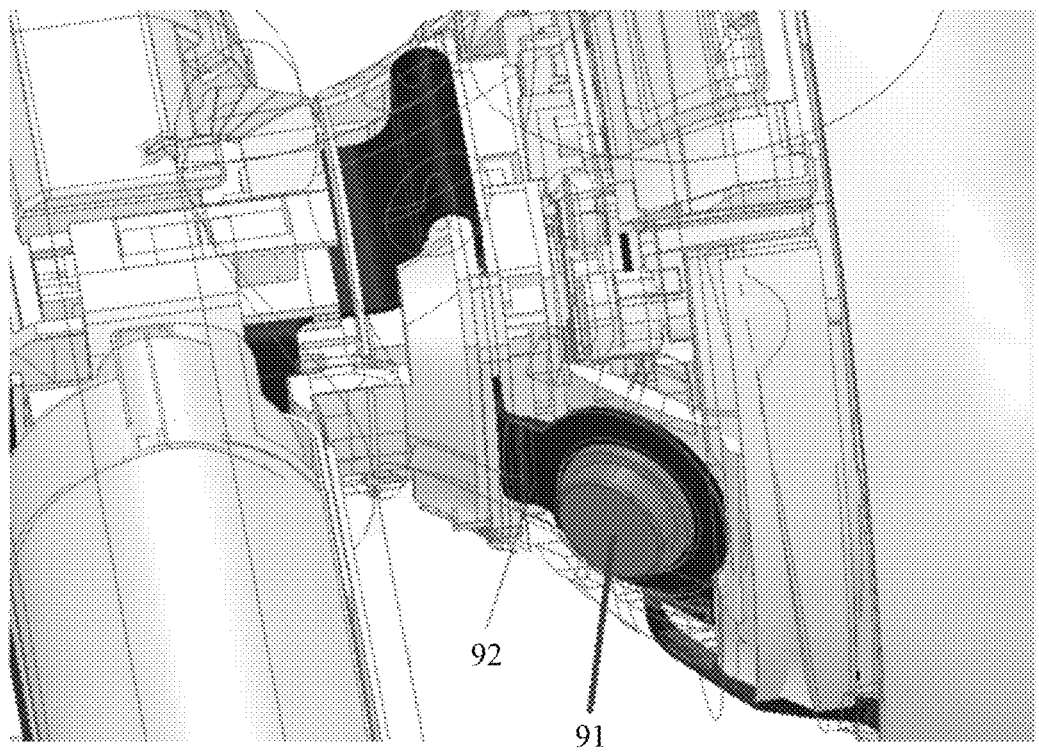
FIG. 9A is a schematic connection diagram of an earphone electrical connector according to an embodiment of this application.
Figure 9B:
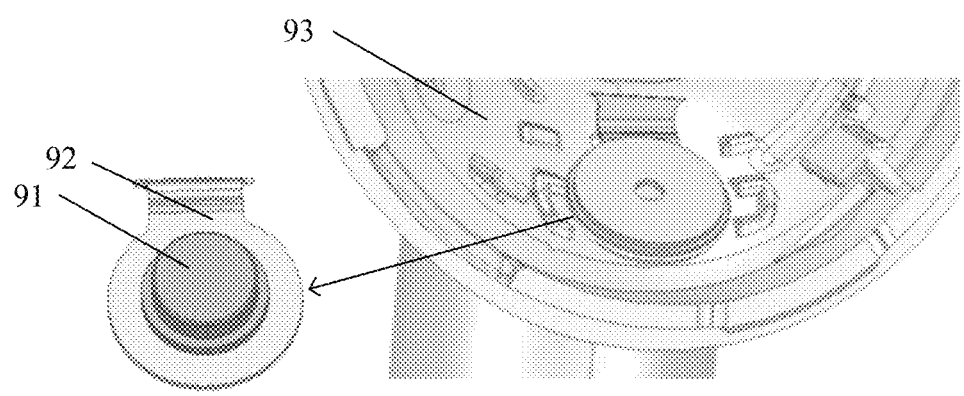
FIG. 9B(a) and FIG. 9B(b) are another schematic connection diagram of an earphone electrical connector according to an embodiment of this application.
Figure 9C:
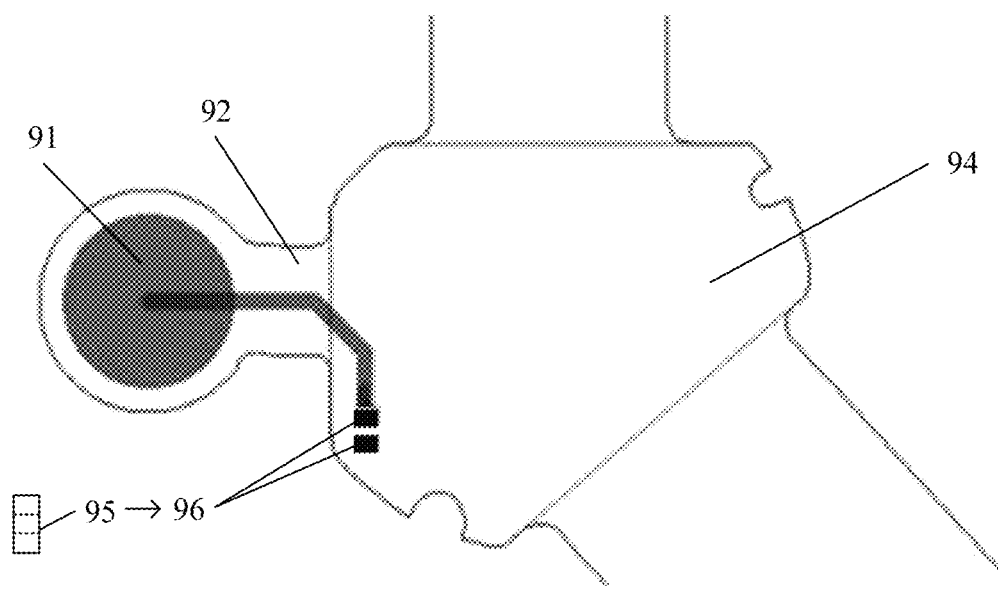
FIG. 9C is a schematic diagram of another circuit board according to an embodiment of this application.

For example, the second earphone electrical connector 604 shown in FIG. 6A may be specifically a conductive patch 91 shown in FIG. 9A and FIG. 9B(a) and FIG. 9B(b). The conductive patch 91 is welded on a flexible board 92, and is electrically connected to the positive electrode of the power management unit on a first rigid board by using a bead, that is, is electrically connected to the positive electrode of the power module. A hole is disposed on a housing of an earphone body, and the conductive patch 91 may protrude from the hole to be exposed outside the earphone body, so as to facilitate contact with a box electrical connector. The conductive patch 91 may be first welded on the flexible board 92, and then installed with the flexible board 92 from the inside of a housing 93 of an earbud. In addition, during installation, an adhesive material (for example, a hot melt adhesive) may be coated around the conductive patch 91, so that the conductive patch is fastened to the housing 93 of the earbud. For example, the conductive patch 91 in FIG. 9C may be electrically connected to the positive electrode of the power management unit on a first rigid board 94 by using a bead 95 disposed on the first rigid board 94. The bead 95 may be welded on the first rigid board 94 by using a bead pad 96.

The flexible board 92 may be disposed inside the rod body 80 in a configuration direction of the rod body 80, so as to connect the second rigid board 82 at the bottom of the rod body 80 and the first rigid board inside the earbud. In addition, the battery in the earphone body may also be long bar-shaped, and is disposed inside the rod body 80 in the configuration direction of the rod body 80.

Figure 10:
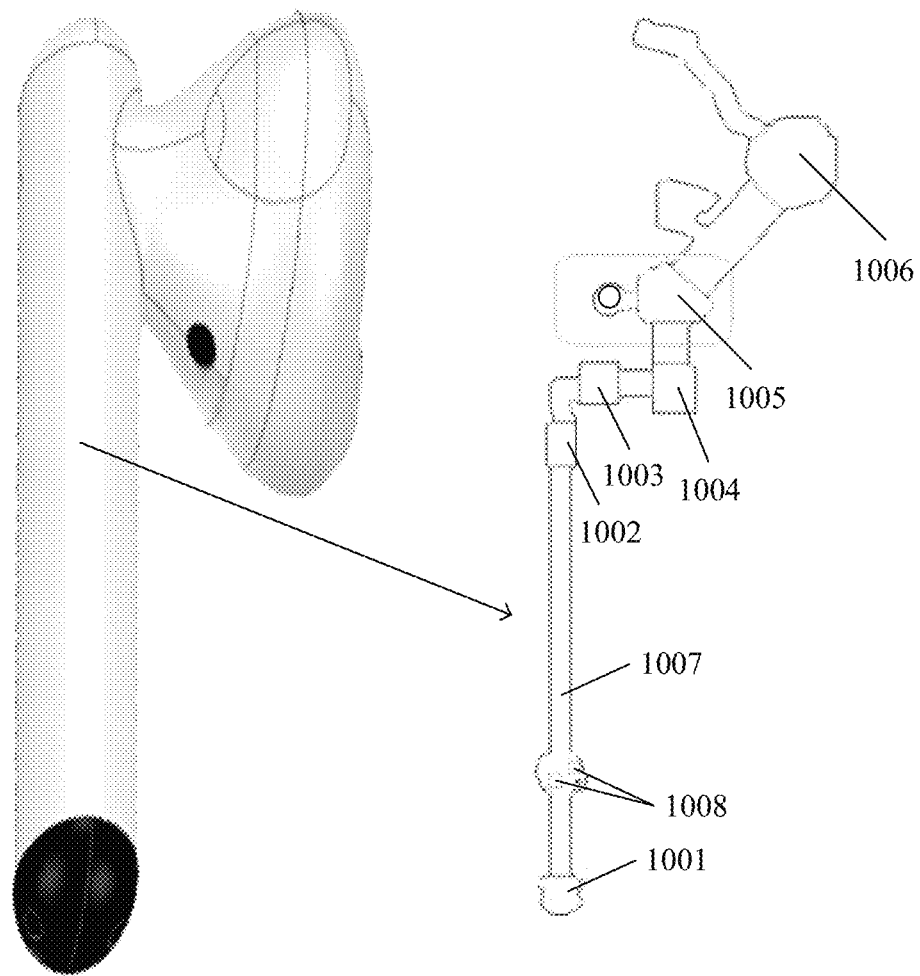
FIG. 10 is a schematic connection diagram of a circuit board of an earphone according to an embodiment of this application.

In some embodiments, as shown in FIG. 10, the cavity of the earphone body may include a plurality of rigid boards and a flexible board configured to connect the plurality of rigid boards. The second rigid board may be a rigid board 1001 disposed at the bottom of the rod body, and the first earphone electrical connector and a corresponding bead may be disposed on the rigid board 1001. The first rigid board may include rigid boards 1002 to 1006 shown in FIG. 10. The battery may be welded on a flexible board 1007 by using a welding joint 1008 on the flexible board 1007, so as to be electrically connected to the first rigid board by using the flexible board 1007. The second earphone electrical connector may be disposed on the flexible board, and is electrically connected to the power management unit on the first rigid board by using a bead on the rigid board 1005 in the first rigid board. The rigid board 1005 may include some or all power management units, for example, the PMIC is disposed on the rigid board 5. The rigid boards 1002 to 1006 may further include other circuits in an existing wireless earphone such as a data processing circuit and an audio processing circuit in the wireless communications module. For details, refer to the conventional technology. Details are not described in this embodiment of this application.

It should be noted that in some existing wireless earphones, the earphone electrical connector may be electrically connected to the electrode of the power module by using a transient diode (transient voltage suppressor, TVS). The TVS component discharges an electrostatic interference signal at a ground end of a circuit system, and processes the discharged electric energy by using a capacitor formed between the ground end and the earth, so as to reduce impact of the electrostatic interference signal on the circuit system in the wireless earphone. Actually, however, the wireless earphone has a relatively small volume, the entire circuit system is relatively small, a configuration area of the ground end of the circuit system is also relatively small, and a capability of processing the electric energy by the capacitor formed between the ground end and the earth is also relatively weak. As a result, it is difficult to discharge a high-energy electrostatic signal to the ground end, and the electrostatic interference signal may still break down a component in the circuit system in the earphone body or cause other interference and impact on the circuit system, and consequently stability of an earphone system is reduced.

However, in this embodiment of this application, the anti-interference component such as a bead or a resistor may suppress and attenuate high-frequency or high-voltage interference signals generated by an electrostatic discharge, a surge, and the like (for example, a high-voltage interference signal of 8000 V may be reduced to 3000 V), so as to prevent the high-frequency and high-voltage interference signal from entering the circuit system in the earphone body, thereby reducing interference and impact of the interference signal on the circuit system in the earphone body, and improving stability of a wireless earphone system.

In addition, the bead is usually used in a scenario in which withstand current is relatively small, and current in the wireless earphone is relatively small. Therefore, a high-frequency and high-voltage interference signal may be suppressed by using the bead to reduce interference.

It can be understood that the second electrical connector disposed on the outer side wall of the earbud may be in another form other than the case shown in FIG. 9A. This is not limited in this embodiment of this application. For example, the second electrical connector may be a pogo pin, a pin, or the like.

In some other embodiments, the first earphone electrical connector shown in FIG. 6A may be connected to the positive electrode of the power management unit by using the first anti-interference component and the connection cable. The second earphone electrical connector may be electrically connected to the negative electrode of the power module.

The first earphone electrical connector at the bottom of the rod body is usually in contact with a face of a user. Therefore, compared with that the first earphone electrical connector at the bottom of the rod body is electrically connected to the positive electrode of the power management unit, when the first earphone electrical connector at the bottom of the rod body is electrically connected to the negative electrode of the power management unit through grounding, impact such as corrosion of the first earphone electrical connector caused by ionization during sweating of a user can be better avoided.

It can be understood that the first earphone electrical connector and the second earphone electrical connector each may be disposed at another location on the earphone body. At least one of the first earphone electrical connector or the second earphone electrical connector may be connected to an electrode of the power module in the earphone body by using the anti-interference component. In addition, the first earphone electrical connector and the second earphone electrical connector may be disposed in a dispersed manner on the earphone body. In this way, a distance between the two earphone electrical connectors is relatively long, and for each earphone electrical connector, there can be enough space inside the earphone body to dispose the anti-interference component, thereby reducing impact, on the circuit system in the earphone body, of high-frequency or high-voltage interference signals generated by an ESD, a surge, and the like, and reducing difficulty in circuit design.

Figure 11A:
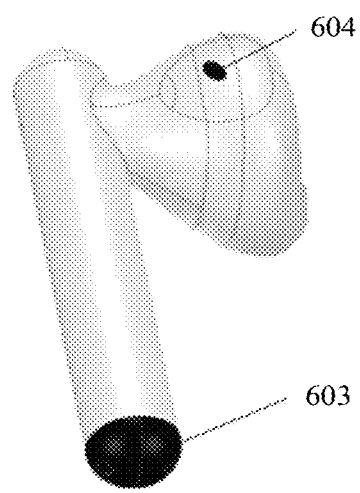
FIG. 11(a), FIG. 11(b), and FIG. 11(c) are a schematic diagram of several groups of locations of an earphone electrical connector according to an embodiment of this application.

For example, as shown in FIG. 11(a), the first earphone electrical connector is located at the bottom of the rod body, and the second earphone electrical connector is located at another location on the outer side wall of the earbud other than the location shown in FIG. 6A.

Figure 11B:
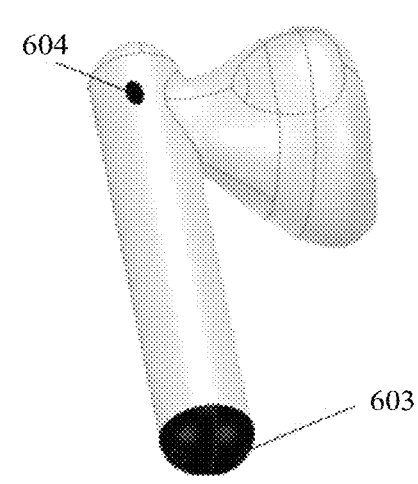

For another example, as shown in FIG. 11(b), the first earphone electrical connector is located at the bottom of the rod body, and the second earphone electrical connector is located at a location that is on the outer side wall of the rod body and that closes to the top of the rod body.

Figure 11C:
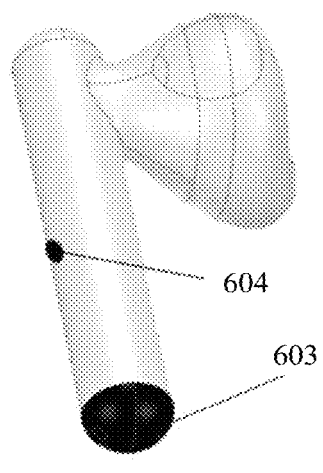

For another example, as shown in FIG. 11(c), the first earphone electrical connector is located at the bottom of the rod body, the second earphone electrical connector is located on the outer side wall of the rod body, and a distance between the two earphone electrical connector is greater than or equal to a first preset value (for example, may be 1 cm).

In the case shown in FIG. 11(a), FIG. 11(b), or FIG. 11(c), in some embodiments, the cavity of the earphone body may include the first rigid board, the second rigid board, and the flexible board. The first earphone electrical connector may be electrically connected to the electrode of the circuit on the second rigid board by using the anti-interference component, and the electrode of the circuit on the second rigid board is electrically connected to the electrode of the power module on the first rigid board by using the flexible board. The second earphone electrical connector may be disposed on the flexible board, and is electrically connected to another electrode of the power module on the first rigid board by using the anti-interference component and the flexible board.

Figure 12A:
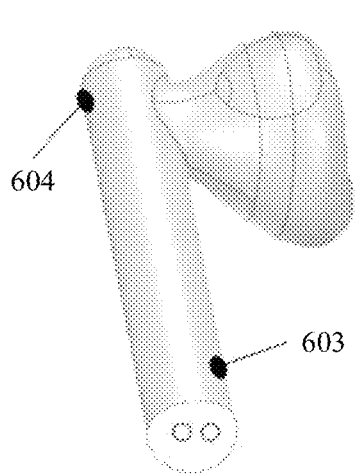
FIG. 12(a), FIG. 12(b), and FIG. 12(c) are a schematic diagram of other several groups of locations of an earphone electrical connector according to an embodiment of this application.

For another example, both the first earphone electrical connector and the second earphone electrical connector are disposed on the outer side wall of the rod body, and a distance between locations of the two earphone electrical connectors is greater than or equal to a second preset value (for example, may be 2 cm). For example, as shown in FIG. 12(a), both the first earphone electrical connector and the second earphone electrical connector are disposed on the outer side wall of the rod body, one is close to the top of the rod body, and the other is close to the bottom of the rod body. In some embodiments, the cavity of the earphone body may include the first rigid board, the flexible board, and a third rigid board. The flexible board is configured to connect the first rigid board and the third rigid board, and the third rigid board may be disposed inside the rod body. The earphone electrical connector close to the bottom of the rod body may be electrically connected to an electrode of a circuit on the third rigid board by using the anti-interference component, and the electrode of the circuit on the third rigid board is electrically connected to the electrode of the power module on the first rigid board by using the flexible board. The earphone electrical connector close to the top of the rod body may be disposed on the flexible board, and is electrically connected to another electrode of the power module on the first rigid board by using the anti-interference component and the flexible board.

Figure 12B:
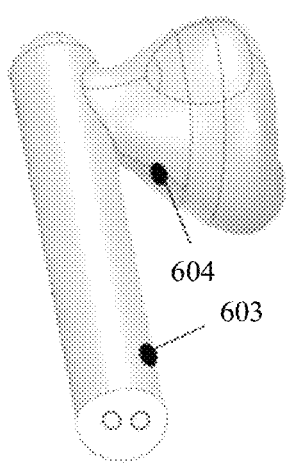

For another example, as shown in FIG. 12(b), the first earphone electrical connector is disposed on the outer side wall of the rod body, and the second earphone electrical connector is disposed on the outer side wall of the earbud. In some embodiments, the cavity of the earphone body may include the first rigid board, the flexible board, and a third rigid board. The flexible board is configured to connect the first rigid board and the third rigid board, and the third rigid board may be disposed inside the rod body. The first earphone electrical connector on the outer side wall of the rod body may be electrically connected to an electrode of a circuit on the third rigid board by using the anti-interference component, and the electrode of the circuit on the third rigid board is electrically connected to the electrode of the power module on the first rigid board by using the flexible board. The earphone electrical connector on the outer side wall of the earbud may be disposed on the flexible board, and is electrically connected to another electrode of the power module on the first rigid board by using the anti-interference component and the flexible board.

Figure 12C:
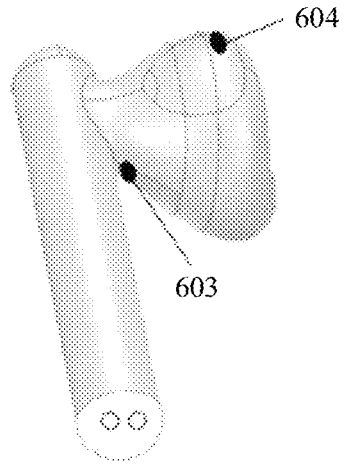

For another example, both the first earphone electrical connector and the second earphone electrical connector are disposed on the outer side wall of the earbud, and a distance between locations of the two earphone electrical connectors is greater than or equal to a third preset value (for example, may be 1 cm). For example, as shown in FIG. 12(c), the wireless earphone includes the rod body and the earbud, one earphone electrical connector is disposed at a location close to a top of the earbud, and the other earphone electrical connector is disposed at a location close to a bottom of the earbud. In some embodiments, the cavity of the earphone body may include the first rigid board. The two earphone electrical connectors may be disposed on the first rigid board, and are respectively electrically connected to two electrodes of the power module on the first rigid board by using the anti-interference component. In some other embodiments, the cavity of the earphone body may include the first rigid board and the flexible board. The flexible board is configured to connect signals on the first rigid board. The two earphone electrical connectors may be disposed on the flexible board, and are respectively electrically connected to two electrodes of the power module on the first rigid board by using the anti-interference component and the flexible board. In some other embodiments, the cavity of the earphone body may include the first rigid board, a fourth rigid board disposed inside the rod body, and a flexible board configured to connect the first rigid board and the second rigid board. The two earphone electrical connectors may be disposed on the flexible board, and are respectively electrically connected to two electrodes of the power module on the first rigid board by using the anti-interference component and the flexible board.

In some other embodiments, the wireless earphone includes the earbud but does not include the rod body. Both the first earphone electrical connector and the second earphone electrical connector are disposed on the outer side wall of the earbud, and a distance between locations of the two earphone electrical connectors is greater than or equal to a third preset value.

In the cases shown in FIG. 11(a), FIG. 11(b), FIG. 11(c), FIG. 12(a), FIG. 12(b), and FIG. 12(c), at least one of the first earphone electrical connector or the second earphone electrical connector disposed in a dispersed manner may be connected to an electrode of the power module in the earphone body after being connected to the anti-interference component.

When the earphone electrical connector is disposed at a location that is on the outer side wall of the rod body and that faces a side of the earbud (as the case shown in FIG. 12(b)), the earphone electrical connector is prone to be blocked by the rod body and a face of a user, so that the earphone body looks simpler and more aesthetic.

After the first earphone electrical connector and the second earphone electrical connector are respectively in contact with and establish an electrical connection to the first box electrical connector and the second box electrical connector in the earphone box, the earphone box may charge the earphone body by using the electrical connection.

For example, in one case, the first earphone electrical connector establishes an electrical connection to the first box electrical connector after being in contact with the first box electrical connector, and the second earphone electrical connector establishes an electrical connection to the second electrical connector after being in contact with the second electrical connector. The earphone box may automatically charge, by using the electrical connection, the battery in the earphone body in which the first earphone electrical connector and the second earphone electrical connector are located.

In another case, the first earphone electrical connector establishes an electrical connection to the first box electrical connector after being in contact with the first box electrical connector, and the second earphone electrical connector establishes an electrical connection to the second electrical connector after being in contact with the second electrical connector. In addition, after detecting, by using a sensor such as a proximity light sensor, an ambient light sensor, or a pressure sensor that is disposed near a cover of the earphone box, that the cover is closed, the earphone box may charge, by using the electrical connection, the battery in the earphone body in which the first earphone electrical connector and the second earphone electrical connector are located.

In another case, the first earphone electrical connector establishes an electrical connection to the first box electrical connector after being in contact with the first box electrical connector, and the second earphone electrical connector establishes an electrical connection to the second electrical connector after being in contact with the second electrical connector. In addition, after detecting a charging indication operation of a user, the earphone box may charge, by using the electrical connection, the battery in the earphone body in which the first earphone electrical connector and the second earphone electrical connector are located. For example, the charging indication operation of the user may be an operation of pressing/touching a charging control by the user, and the charging control may be disposed on an outer surface of the earphone box.

Similar to initiating charging of the earphone body, the earphone box may further stop charging the earphone body. For example, after detecting that the box electrical connector is disconnected from any one or two earphone electrical connectors of the earphone body, the earphone box may stop charging the disconnected earphone body. For another example, after detecting that any one or two earphone bodies are removed from the earphone box, the earphone box may stop charging the removed earphone body. For another example, after detecting a charging stop indication operation of a user, the earphone box stops charging the earphone body.

In addition, the earphone electrical connector is configured to electrically connect to the box electrical connector, and may be made of various conductive materials, for example, a metal such as copper. A specific material is not limited in this embodiment of this application.

In some embodiments, the earphone electrical connector may be made of an alloy to improve oxidation resistance performance. For example, in some solutions, the earphone electrical connector may be made of copper, nickel, and silver alloys. In some other solutions, the earphone electrical connector may be made of phosphorus and bronze alloys. In another solution, different alloys may be used.

In some other embodiments, an outer surface of the earphone electrical connector may be electroplated with an anticorrosion metal (such as gold or silver) to improve anticorrosion strength.

In addition, the earphone electrical connector and the earphone body are liquid-tight sealed to each other, which has a relatively high waterproof level.

In the descriptions of the embodiments of this application, the described specific features, structures, materials, or characteristics may be combined in a proper manner in any one or more of the embodiments or examples.

The foregoing descriptions are merely specific implementations of this application, but are not intended to limit the protection scope of this application. Any variation or replacement readily figured out by a person skilled in the art within the technical scope disclosed in this invention shall fall within the protection scope of this application. Therefore, the protection scope of the embodiments of this application shall be subject to the protection scope of the claims.

What is claimed is:

1. A wireless earphone comprising:
   a housing that forms a cavity;
   a power system disposed in the cavity and configured to supply power to the wireless earphone, wherein the power system comprises a first positive electrode and a first negative electrode;
   a first electrical connector disposed on the housing;
   a second electrical connector disposed on the housing, wherein the first electrical connector and the second electrical connector are dispersed from one another in different respective areas separated by a preset distance; and
   an anti-interference component configured to:
      electrically couple the first electrical connector to the first negative electrode or the second electrical connector to the first positive electrode; and
      suppress an interference signal introduced from the first electrical connector or the second electrical connector,
   wherein the preset distance accommodates the anti-interference component.

2. The wireless earphone of claim 1, wherein the anti-interference component is a bead.

3. The wireless earphone of claim 2, wherein the housing comprises:
   a rod body comprising:
      a top part; and
      a bottom part; and
   an earbud coupled to the top part and comprising an outer side wall,
   wherein the first electrical connector is located at the bottom part, and
   wherein the second electrical connector is located on the outer side wall.

4. The wireless earphone of claim 2, wherein the power system further comprises:
a power management system comprising:
an input end comprising the first positive electrode and the first negative electrode;
an output end comprising a second positive electrode and a second negative electrode;
a power management integrated circuit (IC);
a protection IC; and
a voltameter IC; and
a battery comprising:
a third positive electrode electrically coupled to the second positive electrode; and
a third negative electrode electrically coupled to the second negative electrode.

5. The wireless earphone of claim 1, wherein the anti-interference component is a resistor.

6. The wireless earphone of claim 1, wherein the power system further comprises:
a power management system comprising:
an input end comprising the first positive electrode and the first negative electrode;
an output end comprising a second positive electrode and a second negative electrode;
a power management integrated circuit (IC);
a protection IC; and
a voltameter IC; and
a battery comprising:
a third positive electrode electrically coupled to the second positive electrode; and
a third negative electrode electrically coupled to the second negative electrode.

7. The wireless earphone of claim 6, wherein the cavity comprises:
a first printed circuit board (PCB), wherein the power management system is disposed on the first PCB, and wherein the first negative electrode is grounded; and
a flexible board coupled to the first PCB and the battery, wherein the third negative electrode is grounded using the flexible board and is electrically coupled to the second negative electrode, and
wherein the third positive electrode is electrically coupled to the second positive electrode via the flexible board.

8. The wireless earphone of claim 7, wherein the housing comprises a rod body, wherein the cavity further comprises a second PCB disposed at a bottom of the rod body, wherein the flexible board is configured to couple the first PCB and the second PCB, wherein the first electrical connector and the anti-interference component are disposed on the second PCB, and wherein the first electrical connector is grounded, coupled to the anti-interference component in series and electrically coupled to the first negative electrode.

9. The wireless earphone of claim 8, wherein, on the second PCB, the anti-interference component is coupled to the first electrical connector via a first PCB cable, and wherein a distance between the first PCB cable and any second PCB cable of the wireless earphone is greater than or equal to a preset distance.

10. The wireless earphone of claim 9, further comprising:
a microphone disposed on the second PCB;
a first pickup hole disposed on the second PCB; and
a plurality of second pickup holes disposed on the first electrical connector, wherein the second pickup holes comprise:
a first hole and a second hole that are disposed on an outer wall of the first electrical connector and are coupled via a pipe inside the first electrical connector; and
a third hole extending from the pipe to a side on which the second PCB is located until penetrating the first electrical connector,
wherein the first pickup hole and the second pickup holes are configured to transmit a speech signal of a user to the microphone.

11. The wireless earphone of claim 8, further comprising:
a microphone disposed on the second PCB;
a first pickup hole disposed on the second PCB; and
a plurality of second pickup holes disposed on the first electrical connector, wherein the second pickup holes comprise:
a first hole and a second hole that are disposed on an outer wall of the first electrical connector and are coupled via a pipe inside the first electrical connector; and
a third hole extending from the pipe to a side on which the second PCB is located until penetrating the first electrical connector,
wherein the first pickup hole and the second pickup holes are configured to transmit a speech signal of a user to the microphone.

12. The wireless earphone of claim 7, wherein the anti-interference component is disposed on the first PCB, and wherein the second electrical connector is disposed on the flexible board, is electrically coupled to the anti-interference component via the flexible board, and is electrically coupled to the first positive electrode and to the anti-interference component in series.

13. The wireless earphone of claim 1, wherein the housing comprises:
a rod body comprising:
a top part; and
a bottom part; and
an earbud coupled to the top part and comprising an outer side wall,
wherein the first electrical connector is located at the bottom part, and
wherein the second electrical connector is located on the outer side wall.

14. The wireless earphone of claim 1, wherein each of the first electrical connector and the second electrical connector is a pogo pin interface.

15. The wireless earphone of claim 1, wherein the first electrical connector is a pogo pin interface.

16. The wireless earphone of claim 1, wherein the second electrical connector is a pogo pin interface.

17. A system comprising:
a wireless earphone comprising:
a housing that forms a cavity;
a power system disposed in the cavity and configured to supply power to the wireless earphone, wherein the power system comprises a first positive electrode and a first negative electrode;
a first electrical connector disposed on the housing;
a second electrical connector disposed on the housing, wherein the first electrical connector and the second electrical connector are dispersed from one another in different respective areas separated by a preset distance; and
an anti-interference component configured to:

electrically couple the first electrical connector to the first negative electrode or the second electrical connector to the first positive electrode; and suppress an interference signal introduced from the first electrical connector or the second electrical connector, wherein the preset distance accommodates the anti-interference component; and a mobile phone configured to wirelessly communicate with the wireless earphone.

18. The system of claim 17, wherein the anti-interference component is a bead.

19. The system of claim 17, wherein the anti-interference component is a resistor.

20. A system comprising:
a wireless earphone comprising:
a housing that forms a cavity;
a power system disposed in the cavity and configured to supply power to the wireless earphone, wherein the power system comprises a first positive electrode and a first negative electrode;
a first electrical connector disposed on the housing;
a second electrical connector disposed on the housing, wherein the first electrical connector and the second electrical connector are dispersed from one another in different respective areas separated by a preset distance; and
an anti-interference component configured to:
electrically couple the first electrical connector to the first negative electrode or the second electrical connector to the first positive electrode; and
suppress an interference signal introduced from the first electrical connector or the second electrical connector,
wherein the preset distance accommodates the anti-interference component; and
an earphone box configured to charge the wireless earphone when the wireless earphone is accommodated in the earphone box.

\* \* \* \* \*